United States Patent [19]
Fox et al.

[11] Patent Number: 5,796,932
[45] Date of Patent: Aug. 18, 1998

[54] USER INTERFACE FOR GRAPHICALLY DISPLAYING THE IMPACT OF WEATHER ON MANAGERIAL PLANNING

[75] Inventors: Frederick D. Fox, Wayne; Douglas R. Pearson, Wyomissing, both of Pa.; Diane Caine, Newark, Del.; Andrew Kenney, Glen Mills, Pa.; Richard A. Morris, Harrogate, England; Steve A. Beck; Cathy J. Beck, both of Chadds Ford, Pa.; Robert J. Chu, Chicago, Ill.

[73] Assignee: Strategic Weather Services, Wayne, Pa.

[21] Appl. No.: 504,952

[22] Filed: Jul. 20, 1995

Related U.S. Application Data

[63] Continuation of Ser. No. 181,560, Jan. 14, 1994, abandoned.

[51] Int. Cl.⁶ .......................... G06F 15/00; G06F 17/60
[52] U.S. Cl. .......................... 395/161; 395/155; 395/157; 395/159; 364/402; 364/403
[58] Field of Search .......................... 395/155, 157, 395/159, 161, 156, 158, 160; 364/402, 403

[56] References Cited

U.S. PATENT DOCUMENTS

| | | | |
|---|---|---|---|
| 3,808,410 | 4/1974 | Schlesinger | 235/156 |
| 4,015,366 | 4/1977 | Hall, III | 47/1 |
| 4,218,755 | 8/1980 | Root | 364/900 |
| 4,766,539 | 8/1988 | Fox | 364/401 |
| 4,784,150 | 11/1988 | Voorhies et al. | 128/664 |
| 5,063,506 | 11/1991 | Brockwell et al. | 364/402 |
| 5,128,861 | 7/1992 | Kagami et al. | 364/403 |
| 5,128,862 | 7/1992 | Mueller | 364/405 |
| 5,130,925 | 7/1992 | Janes et al. | 364/420 |
| 5,140,523 | 8/1992 | Frankel et al. | 364/420 |
| 5,168,445 | 12/1992 | Kawashima et al. | 364/403 |
| 5,189,606 | 2/1993 | Burns et al. | 364/401 |
| 5,208,665 | 5/1993 | McCalley et al. | 355/86 |
| 5,237,496 | 8/1993 | Kagami et al. | 364/401 |
| 5,250,941 | 10/1993 | McGregor et al. | 340/825.25 |
| 5,253,165 | 10/1993 | Leiseca et al. | 364/407 |
| 5,283,865 | 2/1994 | Johnson | 395/161 |
| 5,295,064 | 3/1994 | Malec et al. | 364/401 |
| 5,309,355 | 5/1994 | Lockwood | 364/401 |
| 5,377,095 | 12/1994 | Maeda et al. | 364/401 |

FOREIGN PATENT DOCUMENTS

| | | | |
|---|---|---|---|
| 1236396 | 9/1989 | Japan | G07G 01/14 |
| 1259488 | 10/1989 | Japan | G07G 01/12 |
| 2268396 | 11/1990 | Japan | G07G 01/14 |
| 2299059 | 12/1990 | Japan | G06F 15/20 |
| 0477896 | 3/1992 | Japan | G07G 01/12 |
| 4953970 | 12/1992 | Japan | G06F 12/24 |
| 5189406 | 7/1993 | Japan | G06F 15/20 |
| 676161 | 3/1994 | Japan | G07G 01/06 |
| 6149833 | 5/1994 | Japan | G06F 15/21 |

OTHER PUBLICATIONS

Ehrenberg, A.S.C., et al. "The After–Effects of Price–Related Consumer Promotions", *Journal of Advertising Research*, v34n4, p11–22, Jul 8, 1994.

Engle, RF, et al., "Modeling Peak Electricity Demand", *Journal of Forcasting*, v11 N3 p 241–251, 1992.

(List continued on next page.)

*Primary Examiner*—Mark R. Powell
*Assistant Examiner*—Huynh Ba
*Attorney, Agent, or Firm*—Sterne, Kessler, Goldstein & Fox P.L.L.C.

[57] ABSTRACT

The present invention is a graphical user interface (GUI) for use in an Executive Information System (EIS) for managerial planning applications that experience long-range weather impact. The EIS is referred to as a Long-range Executive Weather Information System (LEWIS™). In a preferred embodiment of the present invention, the LEWIS™ system is used to calculate and display to a user the impact of weather on retail planning applications. However, the present invention applies to all industries beyond retailing that experience weather impact, including, but not limited to, personal care, utilities, energy, agriculture, consumer products, insurance, transportation, outdoor events, chemicals, pharmaceutical, and construction.

13 Claims, 21 Drawing Sheets

OTHER PUBLICATIONS

Microsoft® Access™ User's Guide, Microsoft Corporation, 1992 pp. 22–27, 36–39, 327–335, 395–447, 370–373.

Microsoft® Excel User's Guide, Microsoft Corporation, 1992, pp. 280–281, 596–600, 706–708.

Mitchell et al., "Where No Computer Has Gone Before: Massively Parallel Processing Promises Unparalled Performance", *Business Week*, pp. 21, 81–84, 88, 1991.

Jensen, Cary; Anderson, Loy *"Harvard Graphics: The Complete Reference"*, Osborne McGraw–Hill, pp. 5, 16, 17, 126–129, 737–747, 1990.

Brennan, "Portfolio Managers Weather Global Risk Management Challenge", *Wall Street Computer Review*, 7(1):20, 1989.

Best, et al., "Air Weather Service Model Output Statistics Systems", *USAF Air Weather Serive* NTIS, AD–A139129, 1983.

Cave, "Weather Service Is a Boon To System Dispatchers", *Transmission & Distribution*, 43(8):165–169, 1991.

Hurrell, "The Weather Business", *Intercity*, pp. 29–32, Feb. 1991.

The Met Office, "The Weather Initiative", Berkshire, England.

*"Down to Earth Sales Analysis 3.1"*, Business Software Database®, Aug. 18, 1993, available in DIALOG, File No. 256.

*"IMREX Demand Forcasting System"*, Business Software Database®, Aug. 18, 1993, available in DIALOG, File No. 256.

*"Demand Modeling & Forecasting System"*, Business Software Database®, Aug. 18, 1993, available in DIALOG, File No. 256.

904

812

USER INTERFACE FOR GRAPHICALLY DISPLAYING THE IMPACT OF WEATHER ON MANAGERIAL PLANNING

This application is a continuation of application Ser. No. 08/181,560, filed Jan. 14, 1994, now abandoned.

BACKGROUND OF THE INVENTION

1. Field of the Invention

The present invention relates generally to a graphical user interface, and, more particularly, to a graphical user interface for displaying the impact of weather on the retail industry.

2. Related Art

I. The Evolution of Retail Industry Problems

The retail industry has experienced a rapid expansion of consumer demand in the last two decades. This increase in demand has enabled a large number of retailers to grow at the local, regional, and national levels. To meet this growth in consumer demand, most larger national retailers implemented a strategy of store expansion, i.e., increasing the square footage of retail space dedicated to selling products. This strategy, which was particularly common in the early to mid-1980's, resulted in huge increases in the number of stores under operation by a majority of major retailers. Though the increase in square footage enabled the retailers to meet consumer demand, it became difficult to manage the large number of decentralized stores.

These problems were further complicated in the late 1980's and early 1990's. Competition among retailers increased during this period due to recession, personal debt, and maturation of consumer demand. This forced retailers to change their approach from a growth strategy, which solely relied on store expansion, to a productivity-based strategy to maximize return from existing square footage. Essentially, the productivity-based strategy required the maximum amount of product to be moved through a store at a minimum markdown. Implementation of this strategy resulted in planning and coordination problems to achieve the desired productivity at all levels, national, regional, and local.

The problems resulting from these two strategies are best described with reference to the five functions of the retail industry which are critical to the success of every retailer: buying, distributing, promotion, advertising, and financial budgeting. These five functions are of paramount importance to large retailers due to the magnitude of items and locations required to sell directly to consumers.

These five functions are as follows. Buying is the procurement of a product based on an anticipated volume of consumer demand for that product. Distribution is the allocation of the product to the correct locations at the correct times to meet this anticipated consumer demand. Promotion is the offering of an inducement, such as a markdown, to prompt customers to visit a store and purchase specific products. Advertising is the act of selecting and utilizing media to implement promotions, as well as create and foster a desired consumer image for products and the company. Financial budgeting is the act of projecting and authorizing funds expenditures for all aspects of retailer operations to control and maximize financial performance.

Retailers have always been faced with the problem of coordinating the buying, distribution, promotion, advertising, and budgeting activities with constantly changing consumer demand behavior. The magnitude of this problem increased dramatically with the rapid growth of multi-store retailers through additional square footage and the subsequent need to increase the productivity of each of these stores. Productivity-based growth strategies created a coordination requirement for accurate buying, distribution, promotion, advertising and budgeting at regional (merchandising region comprised of several states), MSA (metropolitan statistical area) and local (store location) levels. However, all of these functions historically have been controlled in a centralized fashion by managers based at headquarters.

II. Use of MIS Systems for Retail Sales Forecasting

The conventional approach to achieving this centralized control over a decentralized problem has been the development of computer based MIS (management information system). In the retail industry, the primary function of an MIS is the electronic collection, storage, retrieval, and analysis of data. By definition, retailers sell product to the consumer for profit. Naturally, any type of transaction in support of consumer sales activities is collected and flows through the MIS. Note that the term transaction is used broadly to represent any type of recordable event taking place in support of consumer sales(i.e.:inventory transfer from distribution center to store, promotion data, store traffic, etc), not merely the time, amount and merchandise of a specific sale.

Retailers were initially forced to use mainframe-based MIS systems to store and manipulate data, simply due to the requisite storage and speed of processing provided by mainframe computers. Since understanding of local, MSA and region level dynamics is a requisite for increased retailing productivity, retailers would essentially feed POS (point-of-sale) transactions data at the store level into massive mainframe databases for subsequent analysis to identify basic trends. However, the use of mainframes typically requires the expense of a large MIS department to process analysis and data requests, as well as the delay from the time of request to the actual execution. This structure prevented the MIS systems from becoming cost effective for use by executives in making daily decisions, who are typically not computer specialists and thus had to refer data requests to MIS specialists.

In response to the need for rapid executive interface to data for managerial plan preparation, a large industry developed in Executive Information Systems (EIS) that interfaces into the MIS mainframe or mid-range database but typically operates on personal computer work station platforms. An EIS system is a computer-based means by which information and analysis can be accessed, created, packaged and/or delivered for use on demand by users who are non-technical in background. An EIS system performs specific managerial applications without extensive interaction with the user, which reduces or eliminates the need for computer software training and documentation.

Technical improvements in speed and storage capability of PCs have allowed this trend to take place, while most firms still maintain a mainframe or minicomputer architecture for basic POS data storage and processing. The planning applications have first been implemented at the national and/or regional levels for buying, distributing, advertising, promotional and financial budgeting, although the basic POS store transactions data flows from each store location. The basic underlying approach of current MIS planning solutions to provide centralized control is to retrieve and store POS (store level) data, aggregate it into historical databases, and manipulate the data into useful productivity-based Executive Information Systems (EIS) yielding basic time-series trends in demand at regional or national levels.

Referring now to FIG. 1, a block diagram of a typical MIS system architecture is illustrated. MIS architecture 102 is designed to capture transactions data, and electronically flow this data throughout the organization for managerial planning and control purposes.

At the point of sale (POS) 104 electronic scanners 108, registers 110, and other electronic scanning and data gathering devices record transactions. Store transactions data 116 is electronically transferred to the headquarters typically by modem or broadcasting means. In a typical retail application, there are multiple point of sale locations. In FIG. 1, point of sale 106 has scanners 112, registers 110, and other electronic scanning and data gathering devices to record transactions in a similar manner to point of sale 104. Point of sale 106 electronically transmits store transaction data 118 to the data storage and retrieval facility 120. The headquarters data storage and retrieval facility 120 receives the data using computer hardware 122 and software 124, which is subsequently used for managerial planning purposes.

For analytical purposes the data is retrieved into a data analyzer 126 for use in the preparation of the managerial plan. Retrieval of the data from data analyzer 126 can be accomplished manually, as indicated by line 134, through a custom request to MIS department personnel. Alternative, in the preferred mode, the data and analysis may be electronically generated, as indicated by line 132, into a workstation 128 for immediate viewing and use in the preparation of the managerial plan 130.

Current planning applications software has substantially improved the control of large multi-store retailers over the critical aspects of the retail business (buying, distribution, advertising, promotion, financial budgeting). For example, drawing on the historical sales trend experience of specific merchandise categories at the POS, and factoring in economic and consumer research and forecasting, retailers are more adept at developing national unit sales forecasts for buying and regional allocation for distribution. If they have overstocked at any particular store, product is moved through the store using markdown and other promotional techniques. If retailers understock at a store, buffer inventories and creative supplier relationships such as just-in-time quickly move to replenish. On a national level, these systems have brought major improvements in efficiency and profitability.

Ultimately, however, the goal of most leading multi-store retailers is to enable the MIS applications to perform the analysis at the MSA and/or store level where the true power of the MIS application resides in giving competitive advantage. However, presently, the retail industry has only developed its use of the MIS systems to the point of planning on a regional basis with anywhere from 5–20 merchandise regions. The present management structures and culture are gradually adjusting from the national to the more specific regionality in their decision-making process. This slow transition in the use of data inhibits the transition from national-to-regional-to-MSA-to-local analysis.

III. Weather Forecasting

Most retailers acknowledge weather as a critical variable to sales demand but have had little interest in, or means to address, weather impact from a planning perspective. Relative to weather issues specifically, MIS planning applications systems (both custom and packaged) have virtually ignored this planning variable, at least until very recently. This is partially due to the majority of national retailers only having a fully integrated POS MIS system operational for 3 to 5 years. This is also due to the slow transition in the use of data from the national level data to the MSA and store level.

A. The Nature of Weather Anomalies

Weather anomalies are more of a regional and local phenomenon rather than a national phenomenon. This is not to say that major anomalies cannot sweep an entire country or continent, creating an abnormally hot or cold seasons, but they are less frequent than regional or local aberrations. Major precipitation and temperature anomalies occur continually on daily, weekly and monthly intervals in specific regions, MSAs, or locations throughout the United States.

Another key point to consider about weather is that actual daily, weekly and monthly occurrences fluctuate greatly around the long term "normal" or "average" (in meteorology, normal is typically defined as a 30 year) trend line. In other words, past historical averages are a very poor predictor of future weather on a given day, week or month. Implicitly, weather effects are already embedded in an MIS POS database, so the retailer is consciously or unconsciously using some type of historical weather average as a factor in any planning approach that uses a trendline forecasts based on historical POS data for a given location and time period.

B. Weather Relative to National Planning Applications

At a national level, weather is only one of several important variables driving consumer demand for a retailer's products. Several obvious and usually more important factors are, for example, price, competition, quality, gross national product (GNP) trends, advertising exposure, and structure of the retailer's operations (number of stores, square footage, locations, etc). Relative to the national and regional implementation of planning, the impact of these other variables dominates trendline projections.

As described above, POS databases track sales trends of specific categories at specific locations which are then aggregated and manipulated into regional and national executive information reports. Since local and MSA weather anomalies can average out when aggregated to the national levels, the impact of weather has not received much scrutiny relative to national planning and forecasting. Weather occasionally creates dramatic increases or decreases in product demand on a national level but this is more of an exception as opposed to the rule. (In product manufacturing, this is not the case; weather often creates dramatic gains and losses for highly weather impacted manufacturers, such as air conditioners.)

IV. Weather Relative to Regional and Local Planning Applications

The impact of weather on a regional, MSA and local level is direct and dramatic. At a store level, weather is often the key driver of sales of specific product categories, and also influences store traffic which impacts sales of all goods. Weather directly influences timing and intensity of markdowns, and can create stockout situations which replenishment cycles can not address due to the inherent time lag of many replenishment approaches.

The combination of lost sales due to stockouts and markdowns required to move slow inventory, are enormous hidden costs, both in terms of lost income and opportunity costs. Aggregate these costs on a national level, and weather is one of the last major areas of retailing where costs can be carved out (eliminate overstocks) and stores can improve productivity (less markdown=more margin with same square footage).

Industry market research indicates that on average, many mass retailers operate with only a 50–60% fill rate, meaning approximately 50% of the time a customer in a store cannot find the desired product in stock. A one percent improvement in this fill rate can provide large improvement to the operating profits of a national retailer.

In short, weather can create windows of opportunity or potential pitfalls that are completely independent events relative to economics, consumer income, and competitive issues (price, quality). The cash and opportunity costs in the aggregate are enormous. Presently, the centralization of decision making has generally masked the importance of weather as a critical variable to retailing performance, as sharp local sales fluctuations due to weather tend to average out when aggregated into national numbers.

Thus, the conventional solution to providing a user with a means for displaying weather-related information to assist a user in devising solutions to weather planning problems in the retail industry do not provide an entirely electronic, computerized, EIS implemented graphical user interface (GUI) for ease of data retrieval/analysis which represents predictive models in graphs, formats, and charts immediately useful to the specific managerial applications of buying 206, advertising 210, distributing 208, promoting 212, and financial budgeting 214.

What is needed, therefore, is a Long-range Weather Executive Information System (LEWIS™) which provides a means for displaying the impact of weather on managerial planning applications in a powerful graphical user interface.

SUMMARY OF THE INVENTION

The present invention is a computer-based EIS incorporating a GUI that provides a host of executive reports, charts, and graphs that are tailored for specific managerial applications. The GUI will further aid in rapid assimilation and incorporation of the analysis in the retail planning process.

The LEWIS™ system includes an application program GUI (APG) and one or more multi-dimensional databases. The application program contains six functions: Execu-View™ function, location analysis function, promotion analysis function, product analysis function, weather forecast function, and as-of function. A database management system creates a number of multi-dimensional databases. The database management system accepts and sends file structures and generates reports for the APG and applications development tool. Databases include weather superset database, weather subset database, and sales/weather database. The weather superset database contains the following three dimensions: location, time period, and weather variables. This database contains one year of weather history and one year of weather forecast information for all 318 MSAs in the contiguous United States. Weather subset database contains a subset of the data contained in the weather superset database. This database in limited to only those locations (MSAs) which are applicable to a given LEWIS™ user. The sales/weather database 614 contains four dimensions. These include the three dimensions of the above databases plus a product dimension. Thus, the data contained in the sales/weather database includes the contents of the weather subset database 612 plus client-specific product data.

The Exec-View function provides a user with the capability to view information from variety of perspectives. These functions are based upon the dimensions of the databases The location analysis function provides the user with a graphical presentation of last year's (LY) weather variables by time period by location. These weather/sales variables are presented as comparisons of forecasted versus LY, forecasted versus seasonal, and LY actual weather data. The promotion analysis function provides merchandising, planning, and advertising personnel with the capability to integrate the effects of future weather into promotional plans. A representation of the positive or negative effect of forecasted weather (temperature, precipitation and snowfall), on planned promotional sales is provided, by product, at the MSA level. The product analysis function provides the user with a quantitative presentation of the LY total actual sales; LY total deweatherized sales; TY total plan sales; and TY total weatherized planned sales, by product, at the MSA level. The product analysis screen can be seen in two different formats. They are (1) product format which presents total sales data, by product, for all MSAs, and (2) MSA format which presents total sales data, by MSA, for all products. The weather forecasts function provides the user with a quantitative comparison of this year's and last year's weather for a given location. The as-of function is invoked with the As-Of selection button. The as-of function is solely an information feature available to the user from the main menu banner screen. The selection of this function displays a text screen which contains the date on which the weather information was updated.

In summary, the invention is an EIS, which has a GUI which provides a host of executive reports, charts, and graphs that are tailored for specific managerial applications to aid in rapid assimilation and incorporation of the analysis in planning process. The GUI provides rapid assimilation of analysis for specific managerial planning applications.

BRIEF DESCRIPTION OF THE DRAWINGS

This invention will be better understood if reference is made to the accompanying drawings in which.

DETAILED DESCRIPTION OF THE PREFERRED EMBODIMENTS

Table of Contents

I. General Overview
II. MIS Architecture Implementing The Present Invention
III. Store Transaction Data
IV. Operational Environment
V. Software Architecture
VI. Display Architecture
VII. APG Functions
VIII. Technical Interfaces Between Applications Development Tool and Database Management System

I. General Overview

The present invention is a graphical user interface (GUI) for use in an Executive Information System (EIS) for managerial planning applications that experience long-range weather impact. The EIS is referred to as a Long-range Executive Weather Information System (LEWIS™). In a preferred embodiment of the present invention, the LEWIS™ system is used to calculate and display to a user the impact of weather on retail planning applications. However, the present invention applies to all industries beyond retailing that experience weather impact, including, but not limited to, personal care, utilities, energy, agriculture, consumer products, insurance, transportation, outdoor events, chemicals, pharmaceutical, and construction.

Figure 1:
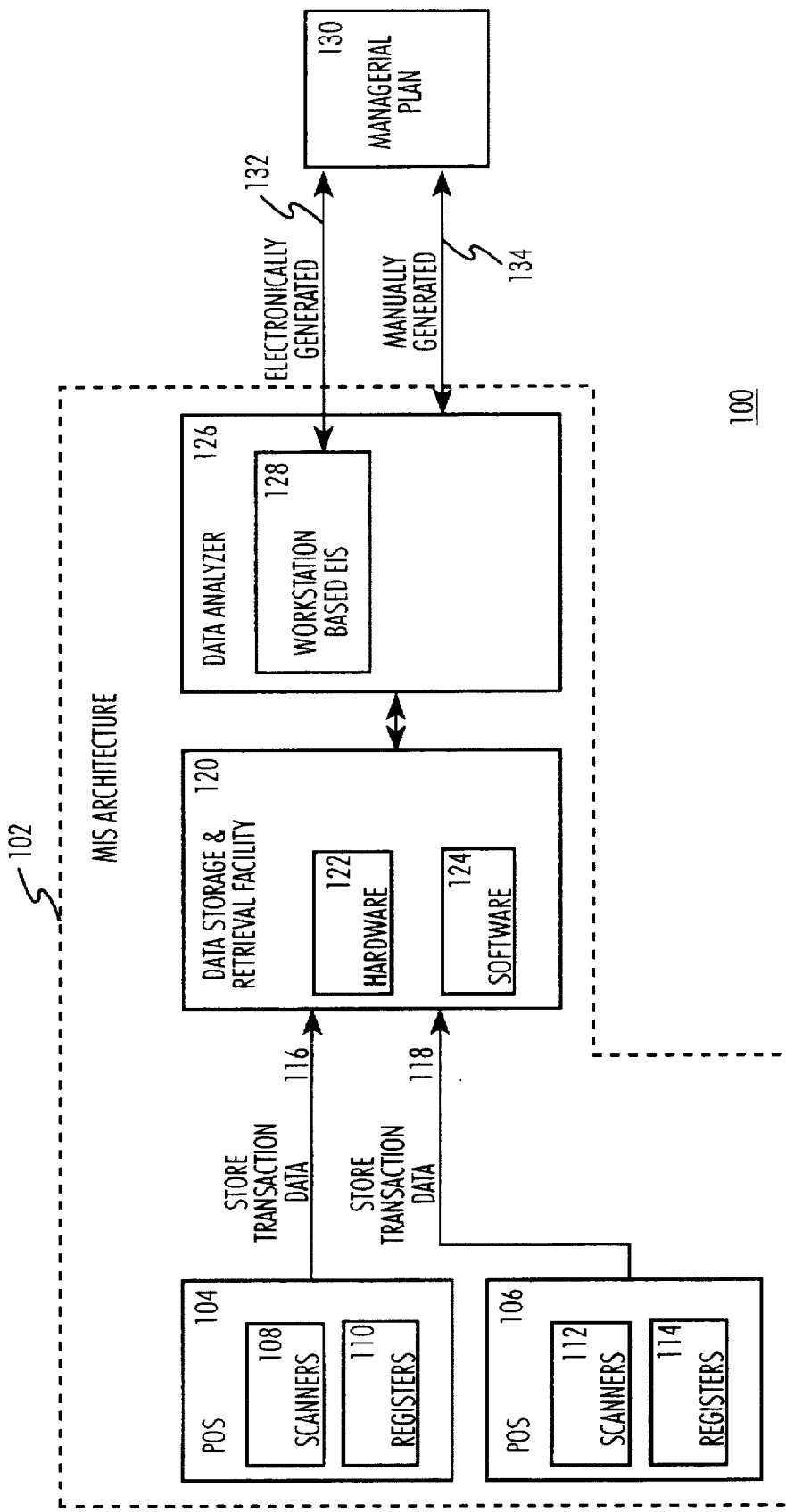
FIG. 1 is a block diagram of a typical management information system (MIS) architecture.
Figure 2:
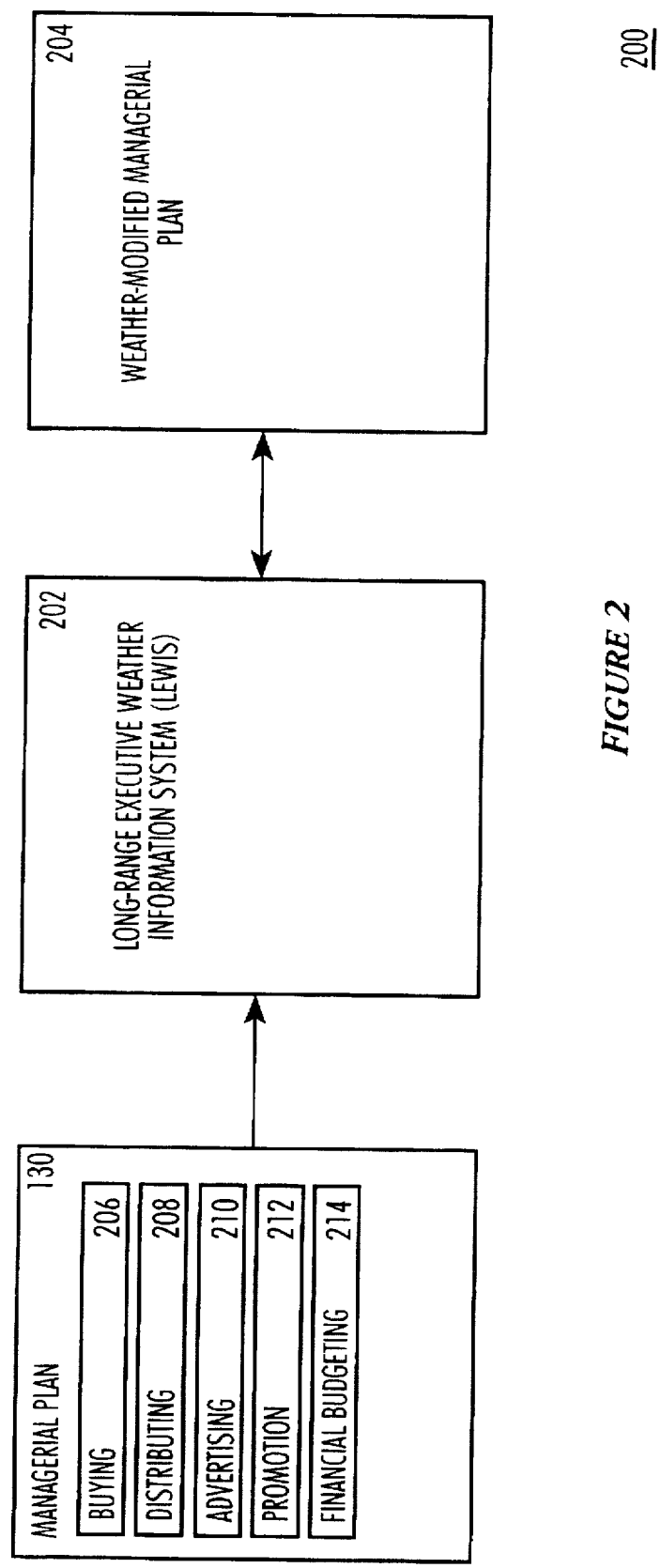
FIG. 2 is block diagram showing the Long-range Executive Weather Information System (LEWIS™) functionality of modifying a managerial plan.

Referring now in detail to the drawings wherein like parts are designated by like reference numerals throughout, FIG. 2 is a block diagram illustrating the use of a LEWIS™ system 202 to accept as an input a preexisting managerial plan 130, and to produce a weather-modified managerial plan 204. In a preferred embodiment of the present invention, pre-existing managerial plan 130 can be any weather-impacted managerial plan. This includes, for example, buying product 206, distributing product to specific locations 208, advertising 210, promotions 212, or financial budgeting 214. These applications are by way of example only; the present invention is intended to apply to any managerial application that experiences weather impact.

II. MIS Architecture Implementing the Present Invention

Figure 3:
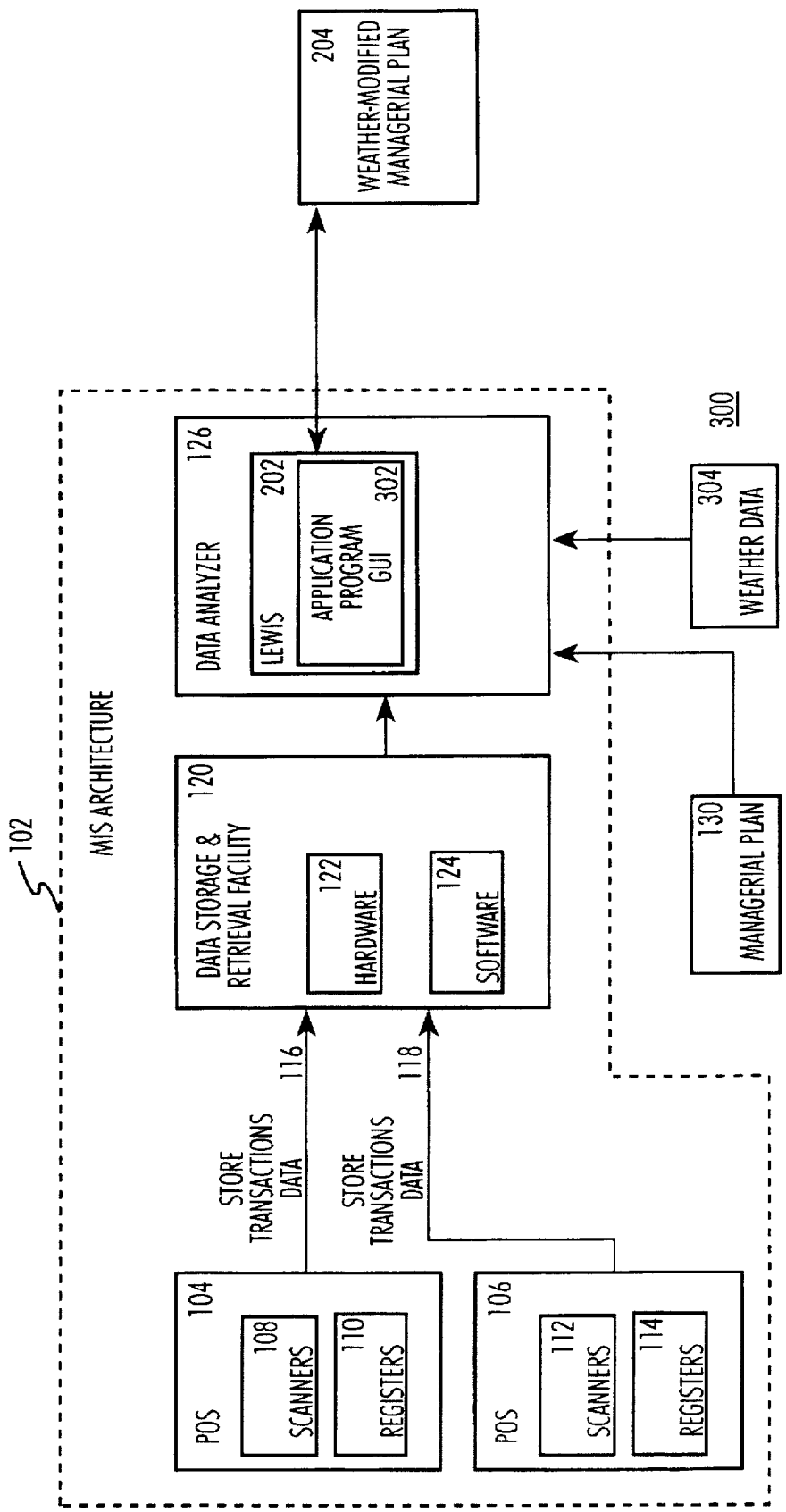
FIG. 3 is a block diagram showing an MIS system containing the LEWIS™ System of the present invention.

Referring to FIG. 3, a block diagram illustrating the typical MIS architecture 102 designed to capture transactions data, and electronically flow this data throughout the organization for managerial planning and control purposes, including LEWIS™ 202 and application program (GUI 302, within this computer-based architecture. In FIG. 3, the arrows depict the flow of data and analysis through MIS 102. Retailers sell product to consumers through store locations 104 and 106, and a primary goal of a retail MIS is to gather, store, and analyze store transactions data 116 and 118. At the point of sale (POS) 104 and 106 (representing multiple stores), electronic scanners 108, 112, registers 110, 114, and other electronic scanning and data gathering devices record store transactions. Any type of transaction in support of consumer sales activities is collected and flows through the MIS. Note that the term "transaction" is used broadly to represent any type of recordable event taking place in support of consumer sales (that is, inventory transfer from distribution center to store, promotion data, store traffic, etc), not merely the time, amount and merchandise of a specific sale. Also note that the present invention is applicable to one or more retail store locations, metropolitan statistical areas, or regions.

Store transactions data 116 and 118 is electronically transferred to the headquarters, typically by modem or broadcasting means, typically on a daily or weekly basis. The headquarters' data storage and retrieval facility 120 receives data 116, 118 using computer hardware 122 and software 124, which is subsequently used for managerial planning purposes. Depending on the MIS age, scope of data and retailer resources, data storage/retrieval 120 can be a mainframe computer, mid-range computer or Personal Computer (PC) network configuration. For the largest retailers, mainframe storage is typical. Note that the present invention contemplates any computer platform or architecture presently available or developed in the future.

For analytical purposes, the data is retrieved into a data analyzer 126 for use in the preparation of the managerial plan 130. In the preferred embodiment, retrieval of the data into LEWIS™ 202 for processing by GUI 302, is electronically generated for immediate viewing and use in the preparation of a weather-modified managerial plan 204.

Hence, the workstation-based LEWIS™ 202, including GUI 302, implemented within the retailer's MIS architecture 102, receives store transactions data 116, 118 as inputs for analysis to create a weather-modified managerial plan 204.

III. Store Transaction Data

Figure 4:
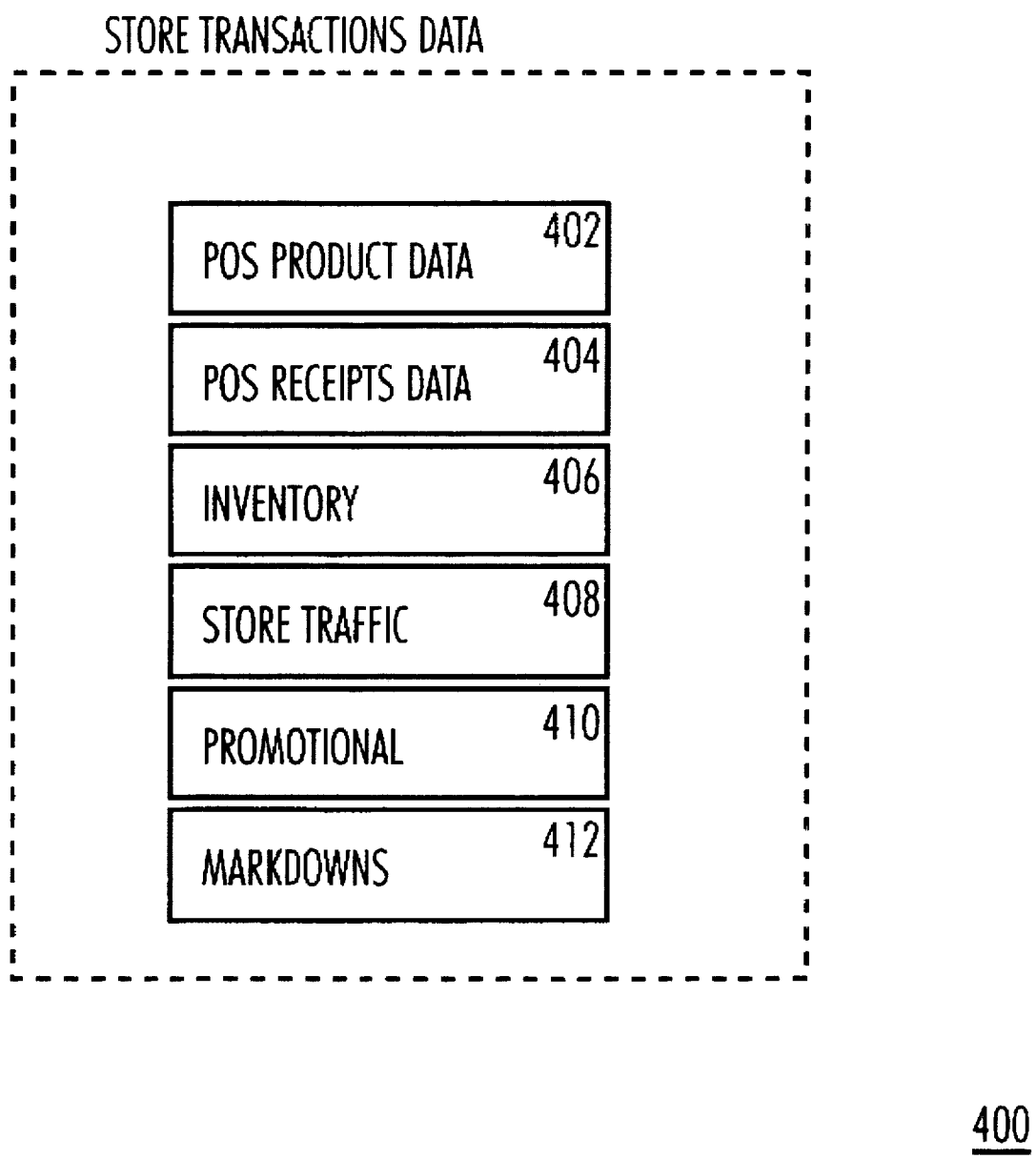
FIG. 4 is a block diagram illustrating exemplary types of store transactions data.

FIG. 4 illustrates in block diagram form the store transactions data which is received from the POS locations 104, 106. The various categories of store transactions data collected can be: POS product data 402, POS total receipt data 404, inventory data 406, store traffic data 408, promotional data 410, and markdown data 412. These categories are by way of example only, and the present invention contemplates any type of store transactions data, or other data collected in the course of an enterprise, which experiences weather impact and can be analyzed to discern commercially valuable analysis for planning purposes. In industries other than retailing, the present invention contemplates any data collected in the course of operating an enterprise which is necessary for and valuable to the activity of planning, including but not limited to Uniform Product Code (UPC) data, shipments to distributors, economic data, competitor data, demographic and financial market data. Throughout this application the term client data is used to refer to all types of data which is weather impacted. As will be discussed below, this includes, for example, data such as managerial plan data, store traffic data, demographic data, distribution data, promotional data, competitor data, and economic data.

IV. Operational Environment

Figure 5:
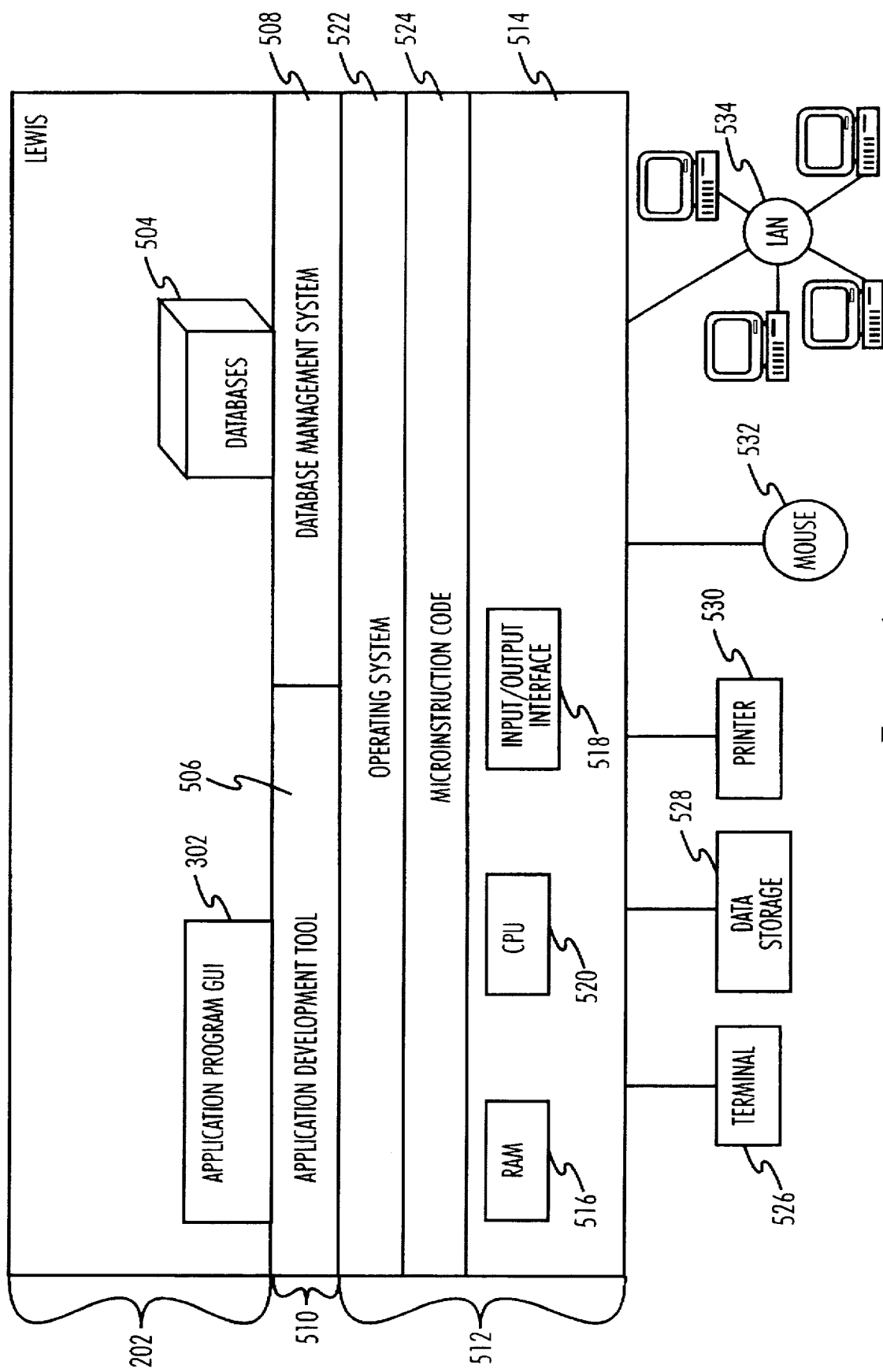
FIG. 5 is a block diagram of the hardware and software architecture of the computer system platform of a preferred embodiment.

FIG. 5 illustrates one computer system environment in which a preferred embodiment of the present invention operates. The preferred embodiment of the present invention includes LEWIS™ 202. LEWIS™ 202 includes application program GUI (APG) 302 and databases 504. APG 302 is created by, and operates with, an Applications Development Tool (ADT) 506. Databases 504 is created by an operates with a database management system 508. Database 504 store the data used by APG 302 to generate weather-modified managerial plan 204 which is displayed to the user by APG 302. The applications development tool 506 and the database management system 508 together are referred to as developmental applications programs 510.

The preferred embodiment of the present invention operates on a computer platform 512. Computer platform 512 includes certain hardware units 514, including a random access memory (RAM) 516, an input/output interface 518, and CPU 520. The computer platform 512 also includes an operating system 522, and may include microinstruction code 524. Various peripheral components may be connected to computer platform 512, such as a terminal 526, a data storage device 528, a printing device 530, an input/output device, such as a mouse 532 or touchscreen. The computer platform 512 may also be configured to operate on a local area network (LAN) 534.

In the preferred embodiment of the present invention, LEWIS™ 200, including GUI 302 of the present invention, is a computer-based Executive Information System (EIS) residing on a PC workstation having, for example, an Intel model 80486 or higher microprocessor. However, as one of ordinary skill in the art should know, LEWIS™ 202 may reside within any computer-based system, including a midrange or mainframe architecture.

In the preferred embodiment of the present invention, operating system 522 is an IBM/Microsoft-compatible disk operating system (DOS). However, as would be obvious to one of ordinary skill in the relevant art, any operating system may be used which is compatible with the applications development tool 510.

In the preferred embodiment of the present invention, applications development tool 506 is Commander™, available from Comshare, Inc., Ann Arbor, Mich., U.S.A. Further information describing the installation, features, and functions of the Commander™ applications development tool 506 may be found in the following manuals, all available from Comshare, Inc.: "Comshare Communications," "Script Command Reference," "Administering Commander™," "Installing Commander™," and "Executive's Guide," herein incorporated by reference in their entirety. However, as would be apparent to one of ordinary skill in the relevant art, applications development tool 506 may be implemented in other forms, such as Powerbuilder™ by PowerSoft, Inc. and Pilot Lightship™, manufactured by Pilot, Inc.

In the preferred embodiment of the present invention, database management system 508 is One-Up™, also available from Comshare, Inc. Applications development tool 506 and database management system 508 must be capable of interfacing with each other to transfer data between application program 302 and databases 504. In addition, applications development tool 506 must be capable of generating requests to retrieve data from databases 504 located in database management system 508.

V. Software Architecture

Figure 6:
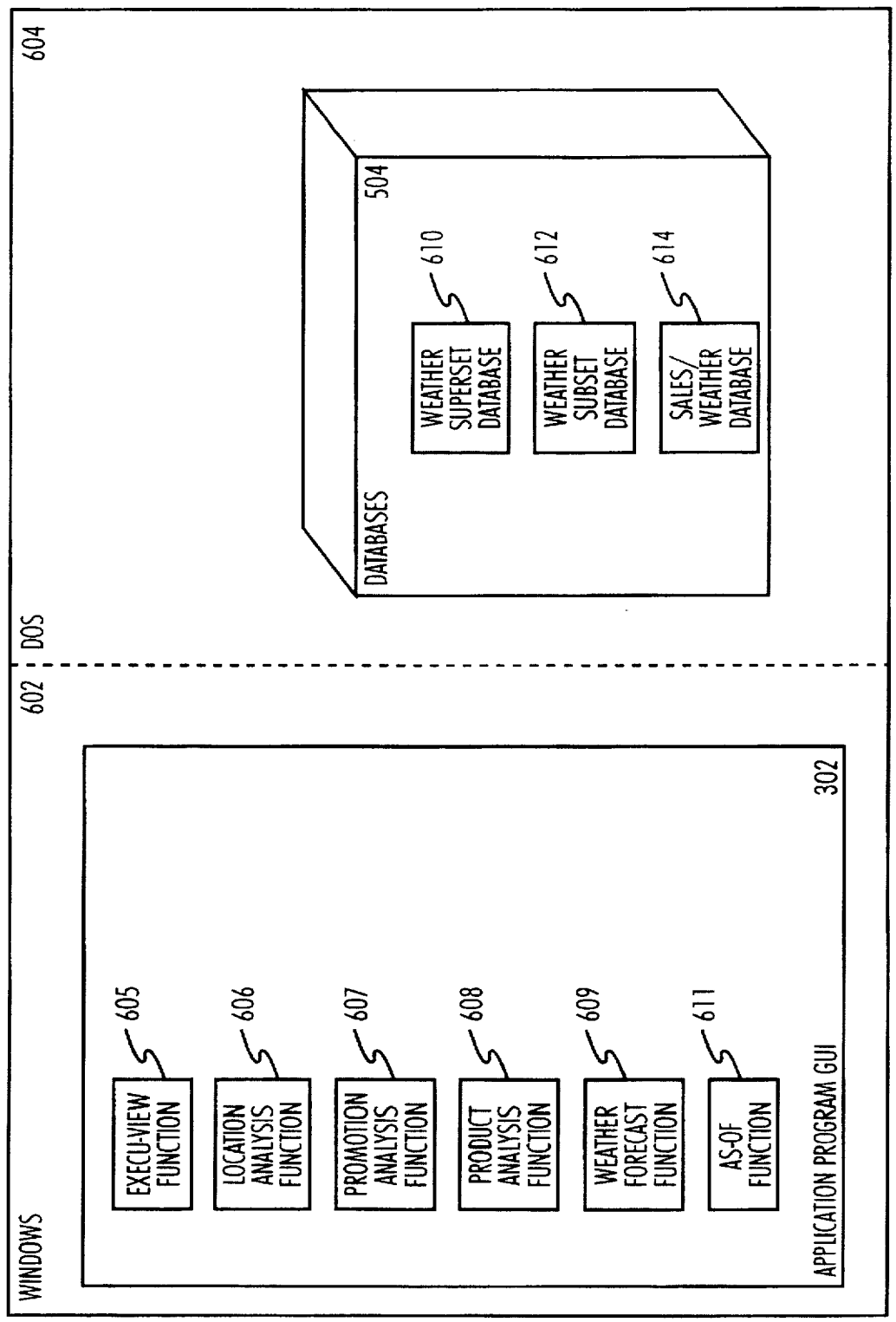
FIG. 6 is a software block diagram of LEWIS™.

FIG. 6 illustrates the architecture of LEWIS™ 202. LEWIS™ 202 includes application program GUI 302 and multi-dimensional databases 504. Application program GUI 302 is a Windows-based application program, depicted in FIG. 6 by the placement of APG 302 in Windows 602. Windows™ is a product of, and may be obtained from, Microsoft, Inc., Redmond, Wash. However, as one of ordinary skill in the relevant art would recognize, application program 302 may be implemented in other operating system interfaces as well, such as Macintosh, manufactured by Apple Computer, Palo Alto, Calif., U.S.A. In the preferred embodiment of the present invention, databases 504 resides in DOS 604. As one of ordinary skill in the art would find obvious, databases 504 may alternatively be implemented on other operating platforms, such as OS/2.

Application program 502 contains six functions: ExecuView™ function 605, location analysis function 606, promotion analysis function 607, product analysis function 608, weather forecast function 609, and as-of function 611. Each of these function are described in detail below.

Databases 504 is a multi-dimensional database created by database management system 508. Database management system 508 accepts and sends file structures and generates reports for the APG 302 and applications development tool 506. Databases 504 include weather superset database 610, weather subset database 612, and sales/weather database 614. The weather superset database 610 contains the following three dimensions: location, time period, and weather variables. This database contains two years of weather history and one year of weather forecast information for all 318 metropolitan statistical areas (MSAs) in the contiguous United States. However, LEWIS™ may be implemented to include other countries as well. Weather subset database 612 contains a subset of the data contained in the weather superset database 610. This database in limited to only those variables that are required to run/operate the promotion analysis and location analysis functions. The sales/weather database 614 contains four dimensions. These include the three dimensions of the above databases plus a product dimension. Thus, the data contained in the sales/weather database includes the contents of the weather subset database 612 plus client-specific product data.

The preferred embodiment of the present invention is a long range weather information system directed to the retail industry containing weather predictive models which provide specificity for location (national, regional, MSA, store level), product (retail sales of individual products, store traffic, demographic, competitor information, economic data, etc.), weather/sales variables (precipitation, snow, temperature, sales units, sales dollars, promotional units, etc.), and time period (e.g., daily, weekly, monthly, yearly).

VI. Display Architecture

Figure 7:
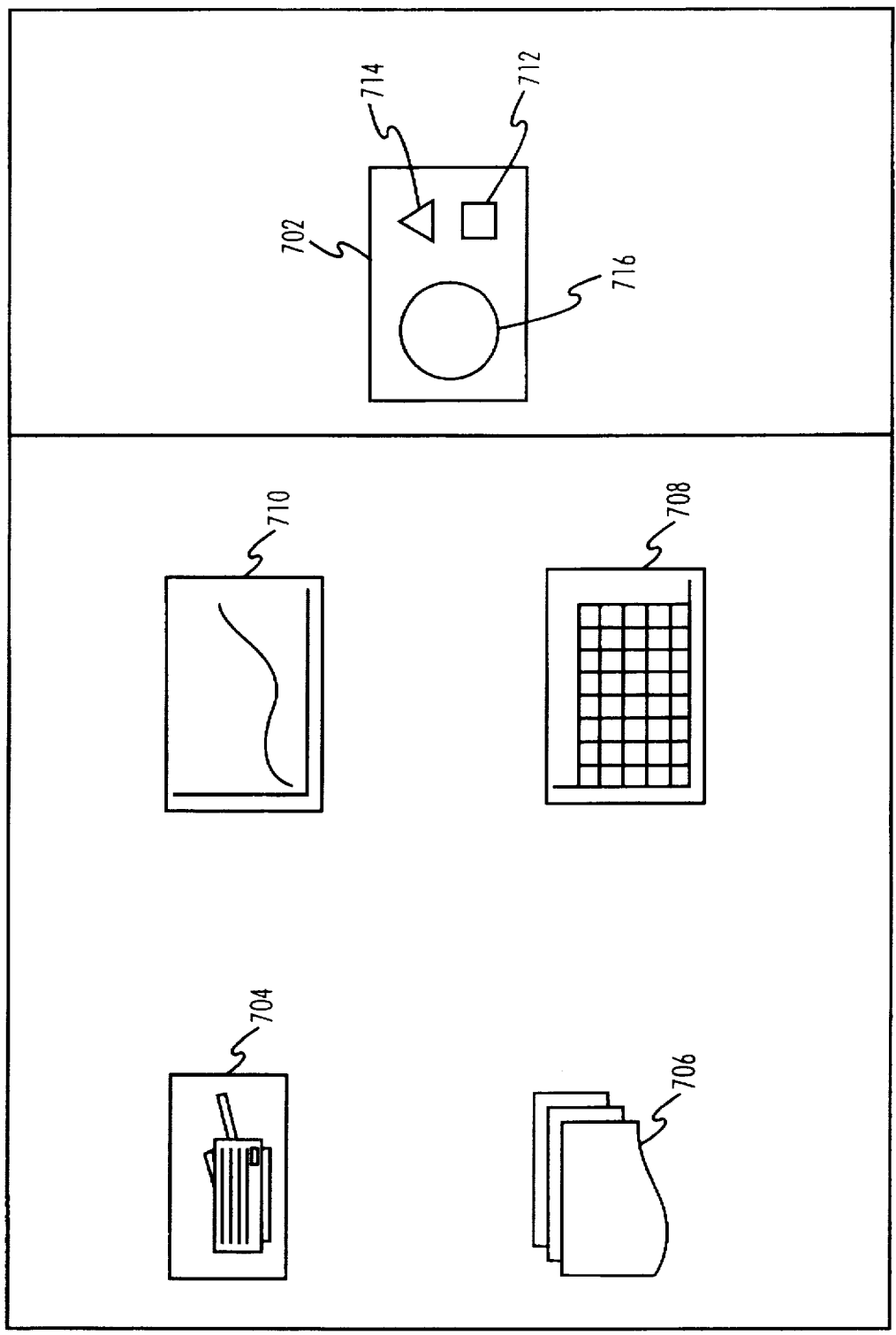
FIG. 7 is an example of the icons and objects displayed on the applications development graphical user interface (ADG) of the present invention.

FIG. 7 illustrates in a simple diagram form the basic application program GUI display. Referring to FIG. 7, display 700 comprises objects 702, icons 704, reports 706, charts 708, graphs 710. APG displays are templates upon which the objects are positioned. In the preferred embodiment of the present invention, the APG displays contain various combinations of the above components. Other forms of displays are also possible, depending upon the capabilities of the applications development tool 506 which is used.

Reports 706, charts 708, and graphs 710 display data retrieved from databases 504 in a variety of forms (discussed below). In it's simplest form, objects 702 are entities which are included in ADG display 700. Objects 702 may be as simple as geometric shapes which is displayed on the ADG display. Examples are square 712, triangle 714, and circle 716. Reports 706, graphs 710, and charts 712 are specific forms of objects 702 used to display data to the user in a particular format. Objects 702 may also be pictures (icons 704) built in the applications development tool 506 or created externally in commercially available drawing packages.

Objects 702 may have attributes such as background color, embedded text, text color. Objects 702 may be programmable or nonprogrammable. Programmable objects represent manipulatable items having specified "methods." A method represents an operation that an object is capable of performing. This invoked method is referred to as a script. Objects 702 may also be nonprogrammable. These objects do not invoke a function or method.

There are three types of scripts: object scripts, named scripts, and automatic scripts. Object scripts, introduced above, are stored with a particular object within a screen and are executed when the user selects the given object with a selection device such as mouse 532. Named scripts are subdivided into two categories: local and global. Local named scripts are stored with specific APG displays and are executed from objects within those displays. Global named scripts are stored as documents in the applications development tool 506. Global names scripts may be called from anywhere in the APG. They are executed from objects within any screen in the APG application. Automatic scripts are automatically invoked upon entering or exiting an APG display. These are referred to as screen entry scripts and screen exit scripts. In the preferred embodiment of the present invention, the functionality achieved by the scripts are a function of Commander™. However, as one of ordinary skill in the relevant art would find obvious, LEWIS™ 202 may be designed by an applications development tool which utilizes other types of object-oriented programmable tools.

VII. APG Functions

Figure 8:
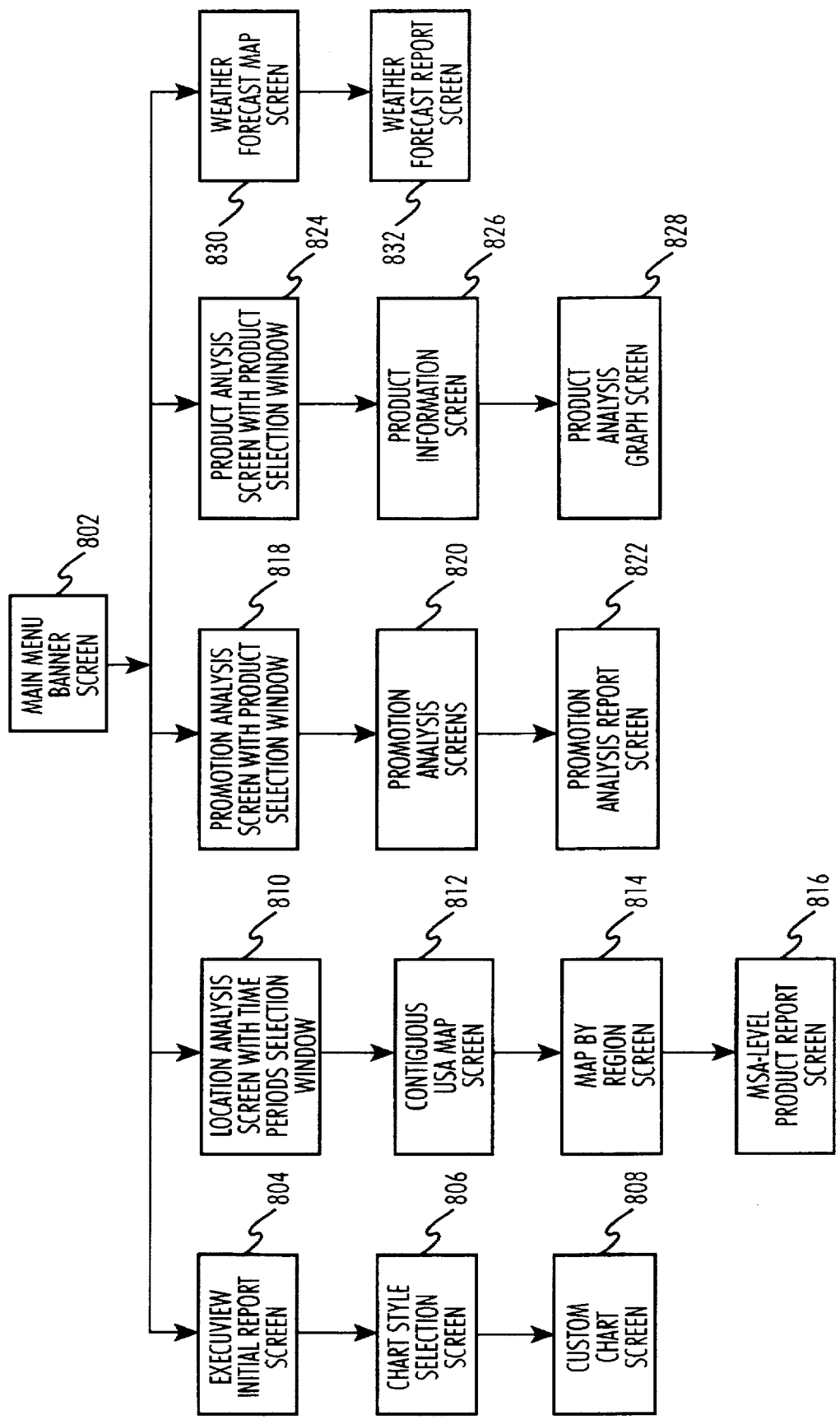
FIG. 8 is a functional navigational hierarchy of the screens displayed on the ADG.
Figure 9:
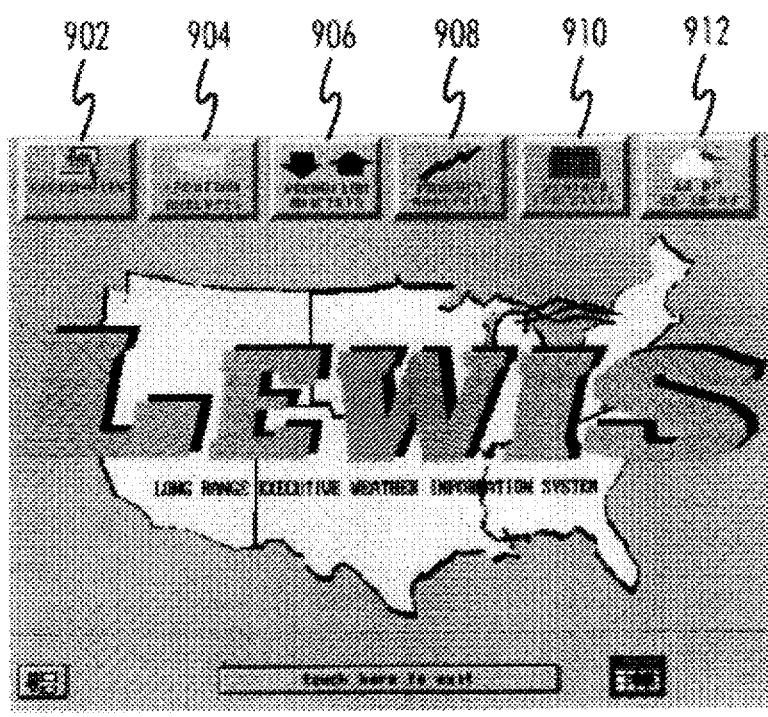
FIG. 9 is a main menu banner screen of Lewis.

FIG. 8 depicts the hierarchy of the preferred embodiment of the APG display function screens contained in GUI 302 illustrated in FIG. 6. FIGS. 9-14 illustrate pictorial representations of the APG display function screens. The functionality associated with each of these function screens is discussed in detail below. Referring to FIG. 8, the initial function screens displayed to the user the main menu banner function screen 802 is illustrated. This function screen is illustrated in FIG. 9. Main menu banner screen 802 contains a map of the country(s) for which LEWIS™ 202 is provided. In the preferred embodiment, this is the contiguous United States. Main menu banner screen 802 also depicts a series of selection button objects across its top which provide the user with the capability of invoking the main functions of LEWIS™ 202. These functions are Execu-View™, location analysis, promotion analysis, product analysis, weather forecasts, and the as-of function.

A. Execu-View™ Function

Figure 10A:
FIG. 10A is the Execu-View™ selection button.
Figure 10B:
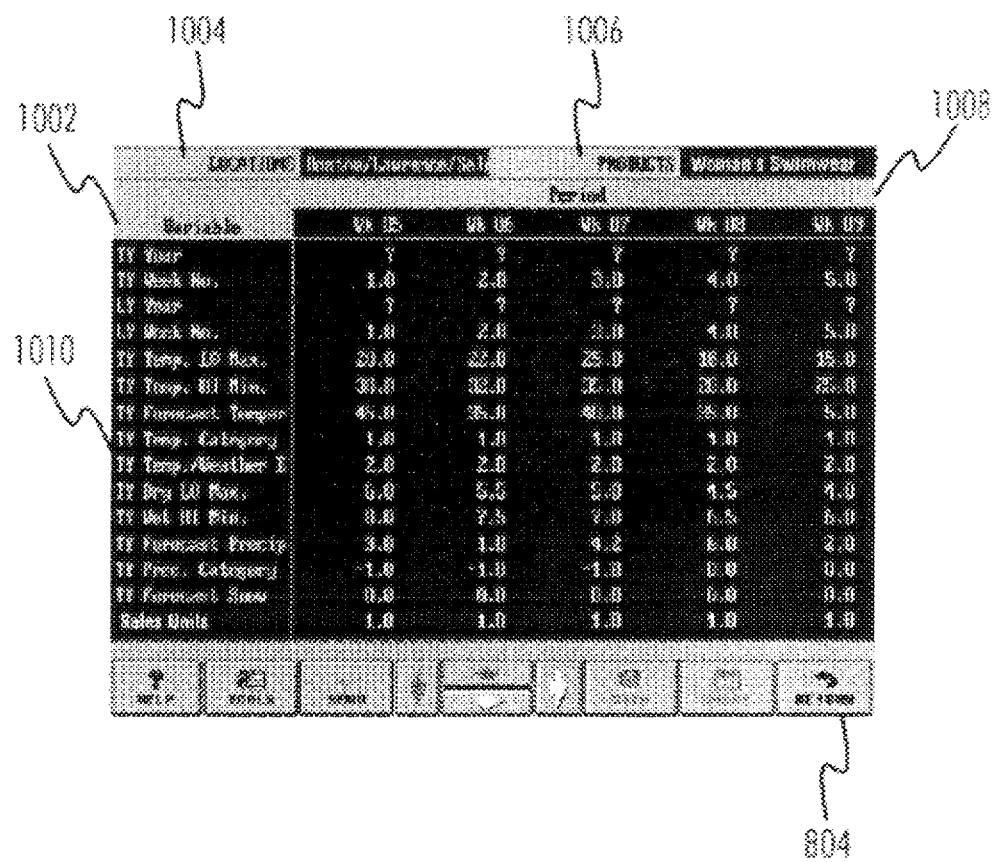
FIG. 10B is a display of the initial report form screen.

The Exec-View™ function 609 is invoked with the Exec-View™ selection button 902. Referring to FIG. 8, this results in the display of the Execu-View™ initial report function screen 804. The Exec-View function 609 provides a user with the capability to view information from variety of perspectives. These functions are based upon the dimensions of the databases 504. These dimensions are product, location, weather/sales variables, and time periods. Execu-View™ provides the user with the ability to select the dimension by which the data is presented. Figure 10B depicts the initial report screen 804 that appears on the APG display when the Execu-View™ selection button 902, shown in Figure 10A, is selected by the user. The initial report screen 804 is divided into four sections: the down section 1002, the across section 1008, the By1 section 1004, and the By2 section 1006. The user selects which database dimensions are displayed in each section. In Figure 10B, the down section 1002 contains the weather/sales variables, the across section 1008 contains the time periods, the By1 section 1004 contains the locations, and the By2 section 1006 contains the products. The ability to view the data in a variety of perspectives in an important feature of the present invention. In Figure 10B, for example, the user has selected to display the weather/sales variables (for example, this year's forecast temperature 1010) by time period (Weeks 5-9) for a given location (Boston/Lawrence/Salem MSA) and product (Women's Swimwear). The user may have alternatively chosen to display products by location for a given time period and weather/sales variable. This provides a completely flexible and unique means of viewing the data contained in multi-dimensional databases 504.

Figure 10C:
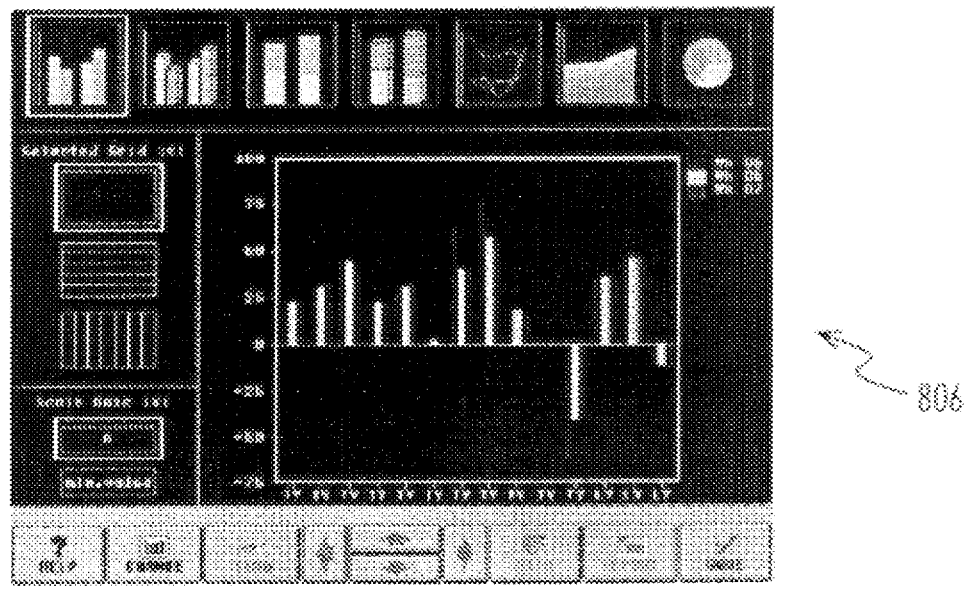
FIG. 10C is a chart-style selection screen.
Figure 10D:
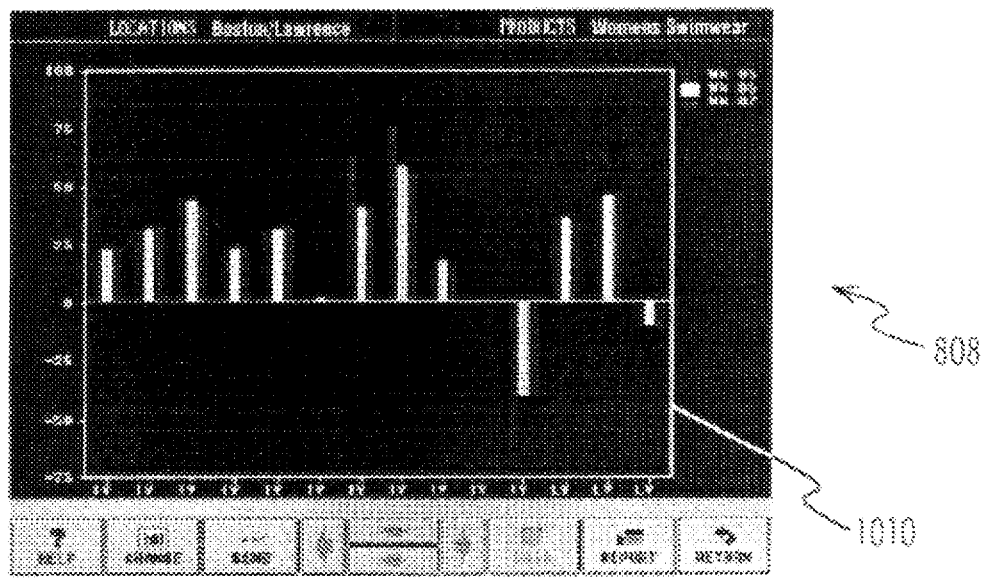
FIG. 10D is a quick bar chart.

LEWIS™ 200 also provides the user with the ability to view the data in other forms other than the report form of the initial report form screen 804. These include the ability to view the data in customized charts and graphs. From the initial report form screen 804, a user may enter the chart style selection screen 806 illustrated in Figures 10C and 10D. Referring to Figure 10C, a user may design a chart which provides a graphical representation of the selected report data which is displayed on the initial report screen 804.

The ability to view the data in a variety of perspectives is also provided in the chart selection screen 806. For example, referring to Figure 10D, the user has selected to display the weather/sales variables (for example, this year's forecast temperature 1010) by time period (Weeks 5-7) for a given location (Boston/Lawrence/Salem MSA) and product (Women's Swimwear). The chart style selection screen 806 has the same flexibility as the initial report form screen 804.

B. Location Analysis Function

Figure 11A:
FIG. 11A is a display of the location analysis selection button.
Figure 11B:
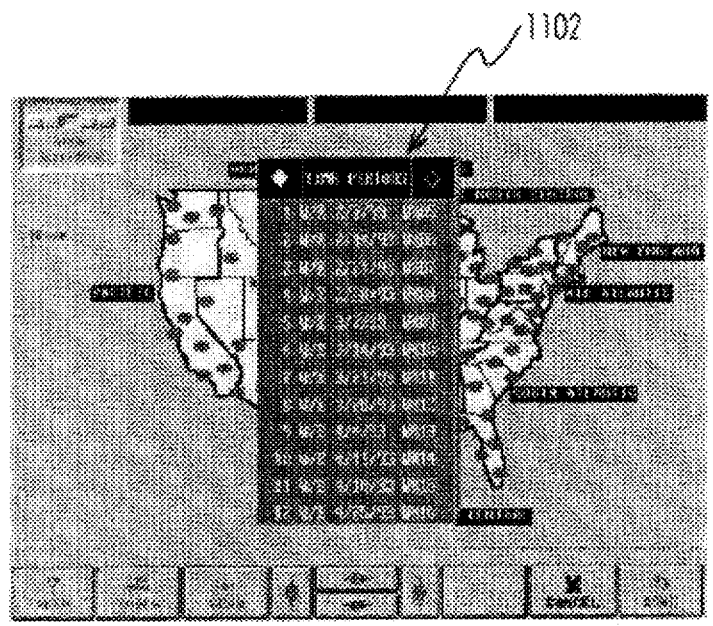
FIG. 11B is a display of the location analysis screen with time periods selection window.

The location analysis function 606 is invoked with the location analysis selection button 904 shown in FIG. 9 and FIG. 11A. Referring to FIG. 8, this results in the display of the location analysis screen 810 on the APG display 700. The location analysis screen 810 is illustrated in FIG. 11B. The location Analysis function 606 provides the user with a graphical presentation of last year's (LY) weather variables by time period by location. These weather/sales variables are presented as comparisons of forecasted versus LY, forecasted versus seasonal, and LY actual weather data.

In the preferred embodiment, the weather variables include seasonal and forecasted temperature, precipitation, and snowfall. However, these variables are a function of the data contained in databases 504 and therefore may be other measurements of weather, such as humidity, cloud cover, heating/cooling degree days, etc. In addition, the location parameters may be MSA, regional, or national.

Referring to FIG. 11B the location analysis function screen 810 is initially displayed with a time period selection window 1102. The user must select a time period (week ending ((W/E) date) from the listing provided in the time period selection window 1102 to continue operating in location analysis function 606. The location analysis function 606 provides weather data in four hierarchical levels: (1) full country; (2) census region; (3) MSA locations within a census region; and (4) product report by specific MSA listing. A user can utilize the location analysis function 606 to determine the factors for a particular location that affected the weatherized features of the user's merchandising plan on a certain week ending date. Weatherized is defined as the process whereby forecasted weather conditions are factored into planned sales.

Figure 11C:
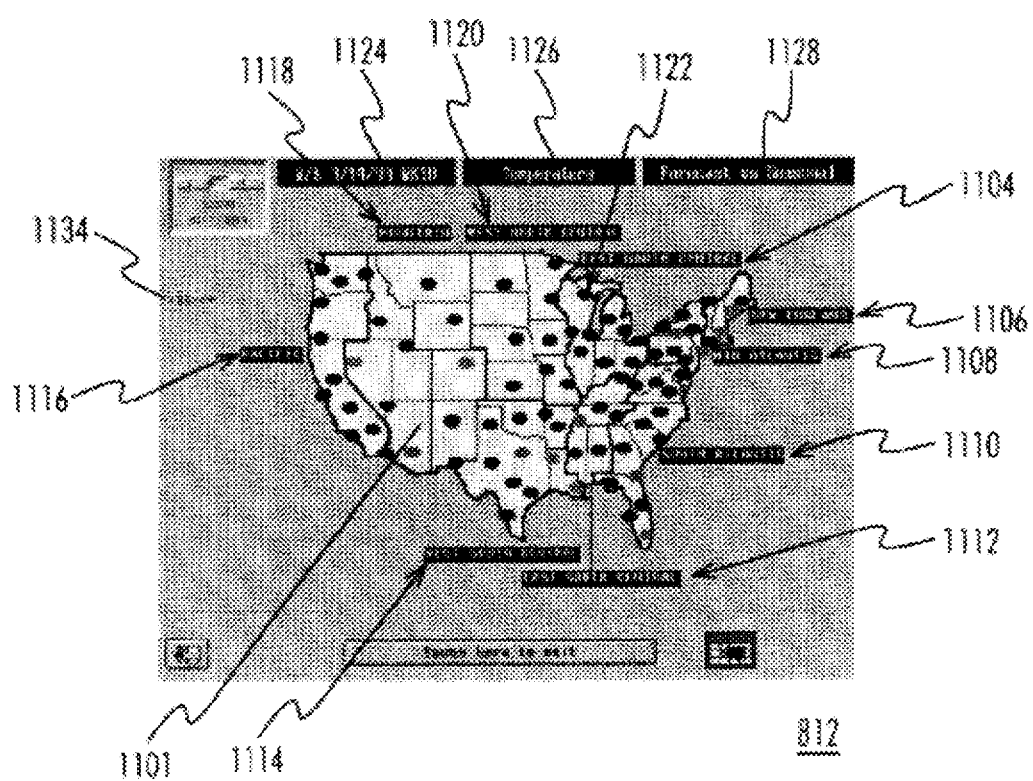
FIG. 11C is a display of the contiguous USA map screen.

When a user selects a week ending date from the time period selection window 1102, the location analysis screen 810 will refresh, and the contiguous USA map screen 812 will appear with nine US census regions and various oval designations of MSA regional areas. This functional screen is referred to as the contiguous US map function screen 812 and is illustrated in FIG. 11C. The nine US region objects include East North Central 1104, New England 1106, Mid Atlantic 1108, South Atlantic 1110, East South Central 1112, West South Central 1114, Pacific 1116, Mountain 11181, West North Central 1120.

The oval MSA areas on the contiguous USA map function screen 812, illustrated by example by reference number 1122, are colored to designate the weather factors for the following default settings: W/E date; Temperature; and Forecast vs. Seasonal. There are three selectable objects across the top of contiguous US map function screen 812. These selectable objects are referred to as the top-left object 1124, top-middle object 1126, and top-right object 1128. The top-left object 1124 brings up the time periods selection window 1102, allowing the user to change to a different time period than initially selected. The top-middle object 1126 brings up a weather selection window 1130 shown in FIG. 11D. This allows the user to select either temperature, precipitation, or snow as the weather parameter. The top-right object 1128 brings up a comparison selection window 1132. Window 1132 allows the user to select a comparison criterion from the report, thereby changing the basis on which the weather information is tabulated and compared. In the preferred embodiment of the present invention, the data may be viewed in the form of forecast vs seasonal, forecast vs. last year, or LY (actual) weather.

The key icon 1134 on the left side of the screen (see FIG. 11C) is an on/off toggle switch that will activate/deactivate the legend for the weather ovals 1122 on the map. The legend will display different colors as the user selects a different weather parameter to view from the weather selection window 1130. For example, the ovals are colored red, gray, or blue to represent variations in the temperature choice on the weather selection window 1130. If the user selects precipitation as the weather parameter, the ovals are colored green, gray, and yellow to represent variations in the amount of precipitation, and if the user selects snow as the weather parameter, the ovals become purple, gray, and yellow to represent variations in the amount of snowfall.

The nine US region objects 1104, 1106, 1106, 1108, 1110, 1112, 1114, 1116, 1118, 1120 allow the user to drill down regionally to see more specific information on the MSA listings in the selected region. Referring to FIG. 8, a selection of one of the US region objects results in the display of the associated map by region screen 814. The map region screen 814 illustrated in FIG. 11D is for the New England Region 1138.

Figure 11D:
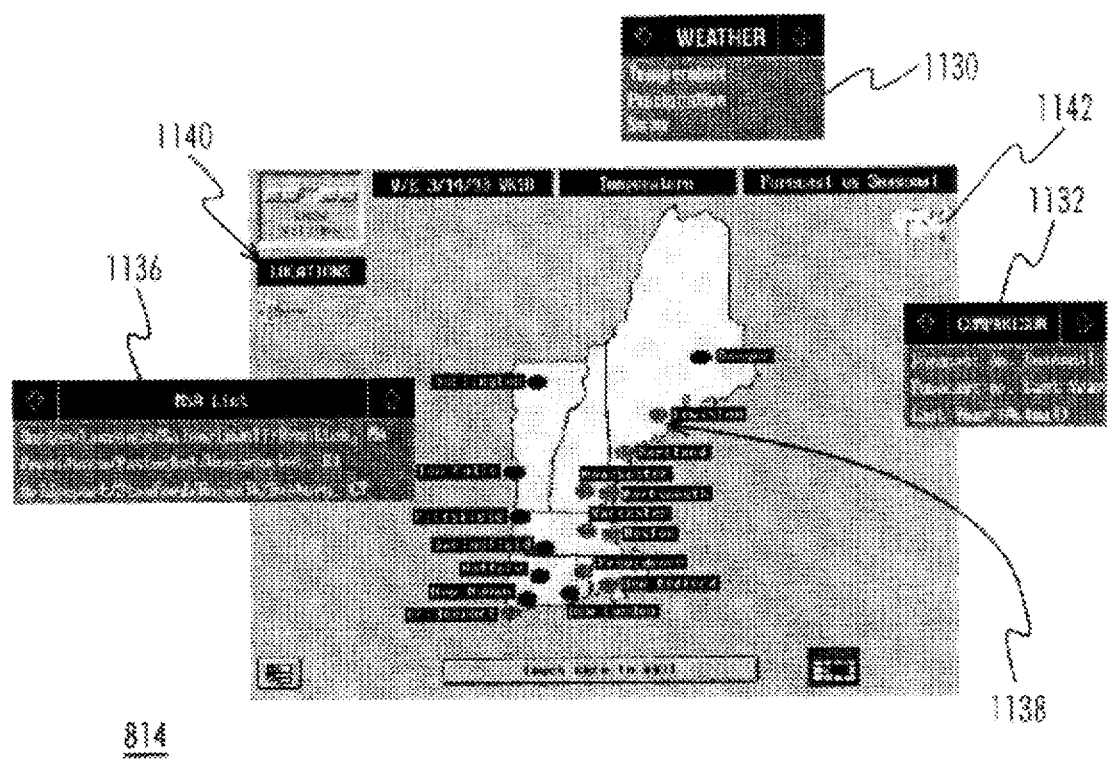
FIG. 11D is a display of the map by region screen.

Referring to the map by region screen 814 in FIG. 11D, the oval areas on the regional map 1138 identify MSA Locations. In areas where the MSA locations are too closely placed to include an oval for each, the MSA locations are grouped together under one oval. In all regional maps there is an additional selectable object, the locations selectable object 1140, located in the upper-left portion of the screen. Selecting locations object 1140 will produce an MSA list selection window 1136 that contains a listing of all MSA locations for which there is data in the multi-dimensional databases 504. These are the MSAs for which a retail user has sales information. Selecting any of the listings in the MSA list selection window 1136, will bring up the lowest-level location analysis screen, the MSA product report screen 816. The user may return to the contiguous USA map screen 812 at any time by selecting the USA icon 1142 in the upper-right corner of the function screen.

Figure 11E:
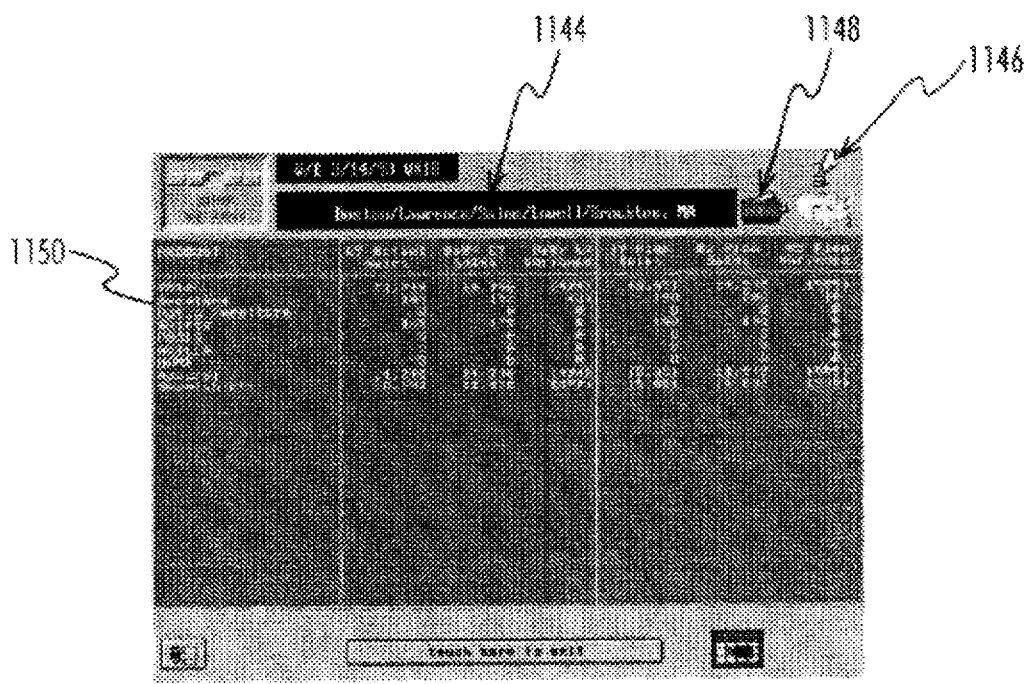
FIG. 11E is a display of the MSA-level product report screen.

Referring to FIG. 11E, the MSA-level product report screen 816 is illustrated. This function screen shows a quantitative presentation of LY actual sales, LY deweatherized sales, this year's (TY) planned sales, and TY weatherized planned sales by time period and location. Deweatherized is defined as the process whereby weather conditions are factored out of historical sales. There are several selectable objects available on the MSA-level product report screen 816. The top-middle selectable object 1144 performs the same functions as locations selectable object 1140. In addition, the top-middle selectable object 1144 also provides store level selections. In MSA-level product report form function screen 816 illustrated in FIG. 11E, this icon represents the New England Census Region. Each region icon has the same shape as the region presented in the MSA-by-region function screen 814. To return to the MSA-by-region function screen at any time, the user selects this icon. There is a store-level object at the top of the MSA-level product report function screen 816. In the illustrated example, the store-level object shows the location for the report to be the Boston/Lawrence/Salem MSA. Selecting this object brings up an MSA list selection window 1136 that includes the MSA on which the report is built and all of the retailer's stores in that MSA.

The printer icon 1148 allows the user to print the report exhibited on the screen. Selecting one of the store listings from selection object 1150 changes the screen report to the product statistics applicable to that unit only. The product selection object 1150 allows the user to change the product listings in the report screen. Selecting object 1150 brings up the products selection window 1102 of FIG. 11B.

C. Promotion Analysis Function

The promotion analysis function 607 is invoked with the Promotion Analysis selection button 906. Referring to FIG.

8, this results in the display of the promotion analysis function screen 818. The promotion analysis function 607 provides merchandising, planning, and advertising personnel with the capability to integrate the effects of future weather into promotional plans. A representation of the positive or negative effect of forecasted weather (temperature, precipitation and snowfall), on planned promotional sales is provided, by product, at the MSA level.

Figure 12A:
FIG. 12A is a display of the promotion analysis selection button.
Figure 12B:
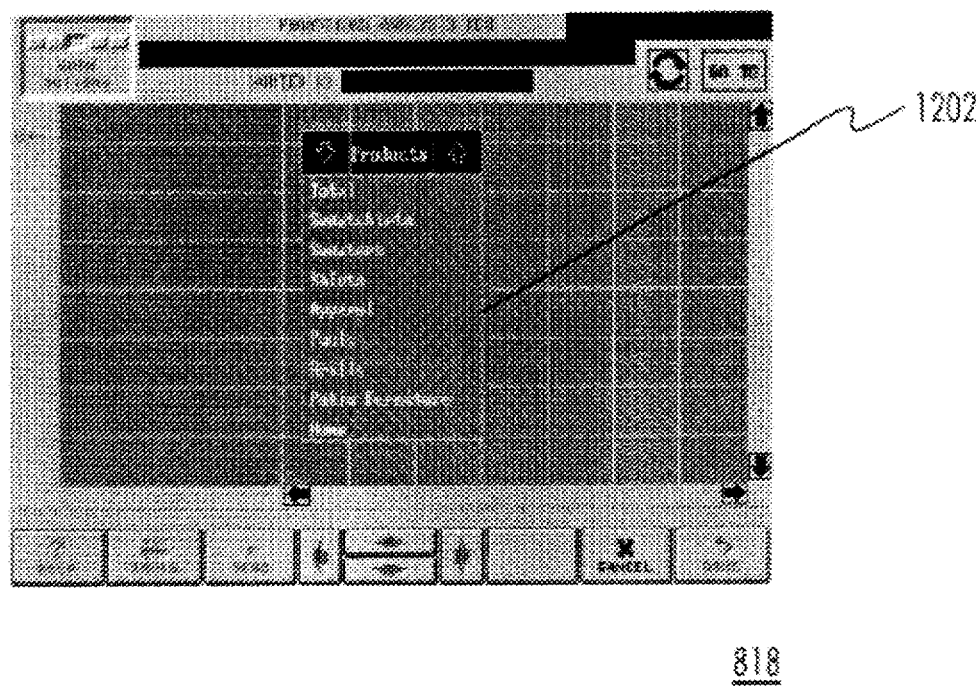
FIG. 12B is a display of the promotion analysis screen with products selection window.

FIG. 12B depicts the promotion analysis screen 818 that appears on the APG display 700 when the promotion analysis selection button 906, shown in FIG. 12A, is selected by the user. The promotions analysis function screen 818 is initially displayed with a product selection window 1202. The user must select a product from the selection window 1202 to perform the promotional analysis function 607. In the preferred embodiment of the present invention, the promotion analysis function 607 provides graphical data for a selected time period, either by product for a group of locations or by location for a group of products. This use of this product by time analysis feature in the preferred embodiment is due to the intrinsic nature of promotional planning in the retail industry. However, other database dimensions may be used depending upon the nature of the application.

The time period for which the promotion analysis junction 607 is performed may be carried forward from the previous performance of another LEWIS™ function. Otherwise, the user will be prompted by a time period selection window 1102 to selected a desired time. The promotions analysis screen 818 will then appear containing the data retrieved from databases 504 based upon the above product and time period selections.

Figure 12C:
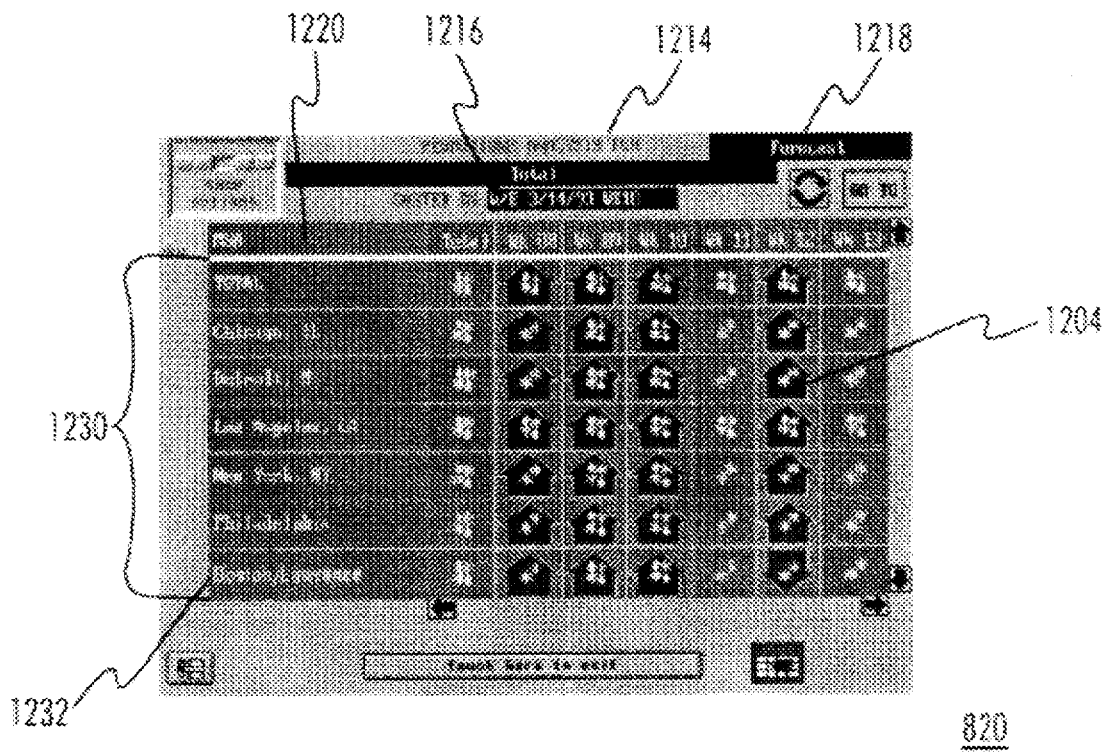
FIG. 12C is a display of the promotion analysis screen.

The two remaining database dimensions are weather/sales variables and locations. There are two options for the weather/sales variable dimension. They are forecast and last year actual weather/sales data. The promotion analysis function defaults the user to forecast weather/sales variables values as shown in FIG. 12C by reference 1218. The top-right selectable object 1218 brings up the year-type selection window 1212 shown in FIG. 12H. This allows the user to graphically select one of the two available views of weather/sales data: forecast (for this year) or LY (actual) weather.

The location dimension is automatically determined by the promotion analysis function. The promotion analysis screen 820 is shown with an listing of all MSA's for which there are sales data in the multi-dimensional databases 504, sorted by sales/unit/dollars.

Figure 12D:
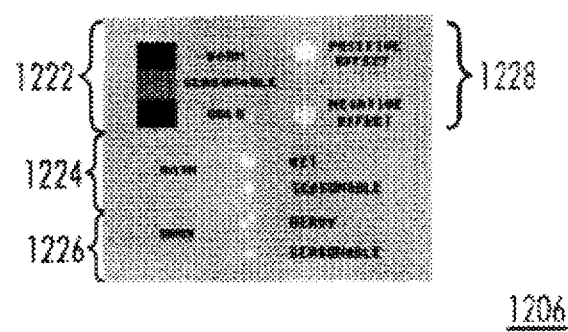
FIG. 12D is a display of the promotion analysis display legend.

The promotions analysis function screen 820 is a graphical screen which shows effects of forecasted weather on a specific product/location combinations. This function screen is used by the retailer to identify specific weeks to promote and/or advertise a specific product across multiple locations. Referring to FIG. 12D, the various icons which are displayed to depict the effects of weather are illustrated by legend screen 1206. Legend screen 1206 is displayed when the user selecting key icon 1134. The trends include the three weather measurements of temperature, precipitation, and snowfall. The temperature weather variable is displayed by coloring the background of the associated grid location with three different colors 1222. In the preferred embodiment, these are red for warm, grey for seasonal, and blue cold.

They can be defined as follows. Seasonal temperature is defined as a weekly temperature that occurs within a selected narrow temperature range for a specific location and period. It is based on the 40% of occurrences centered around the weekly mean temperature during a 30 year period of historical weather data. Warm temperature is defined as a weekly temperature that is above the seasonal temperature range for a specific location and period. It is based on the warmest 30% of occurrences during a 30 year period of historical data. Cold temperature is defined as a weekly temperature that is below the seasonal temperature range for a specific location nd period. It is based on the warmest 30% of occurrences during a 30 year period of historical data.

Precipitation weather variable is displayed by presenting one or two icons 1224 in the associated grid location. These two icons represent whether the forecasted or last year's weather is wet (two raindrops) or seasonal (a single raindrop). Seasonal precipitation is defined as a weekly precipitation amount which occurs within a selected precipitation range for a specific location and period. It is based on the amounts between 0.25% and 150% the weekly normal during a 30 year period of historical weather data. Wet precipitation is defined as a weekly precipitation amount which is greater than seasonal precipitation.

Snowfall is displayed by presenting one or two icons 1226 in the associated grid location. These two icons represent whether the forecasted or last year's snowfall is heavy (two snowflakes) or seasonal (a single snowflake). Seasonal snowfall is defined as a weekly snowfall amount which occurs within a selected snowfall range for a specific location and period. It is based on the amounts between 0.25% and 150% the weekly normal during a 30 year period of historical weather data. Heavy snowfall is defined as a weekly snowfall amount which is greater than seasonal snowfall.

The portrayal of the positive and negative effects of weather on promotional planning are depicted by displaying up-and-down pointing arrows 1228 in the grid location associated for a given product and location. Thus, the effect of the above three weather variables on sales for a given product at a particular location for a particular time period is provided with a single indicator.

There are three selectable objects across the top of the screen and one selectable object at the top of the first column in the matrix. These objects are referred to as top-center object 1214; lower-center object 1216; top-right object 1220; and first-column object 1220. The top-center selectable object 1214 lists all MSA locations when in MSA mode (default). It lists all products and total products when in Product mode. This allows the user to modify the displayed report by selecting only the item(s) and location(s) required in the report at any one time. The lower-center selectable object 1216 brings up the time periods selection window 1102. This allows the user to select a different time period (W/E date).

The data shown in the first column, which is a function of the mode chosen, has a column header of either MSA or product. This is the first column object 1220. Selection of this object lists all MSA locations when in MSA mode (default) and lists all products and total products when in Product mode. The allows the user to modify report by selecting only the item(s) and location(s) you need in the report at any one time. The circular reference icon 1208, shown in FIG. 12E, allows the user to change the report from the default, which is product by location, to location by product. Selection of the circular reference icon 1208 displays a report by selection window 1209, providing the user with the two available options discussed above.

Figure 12E:
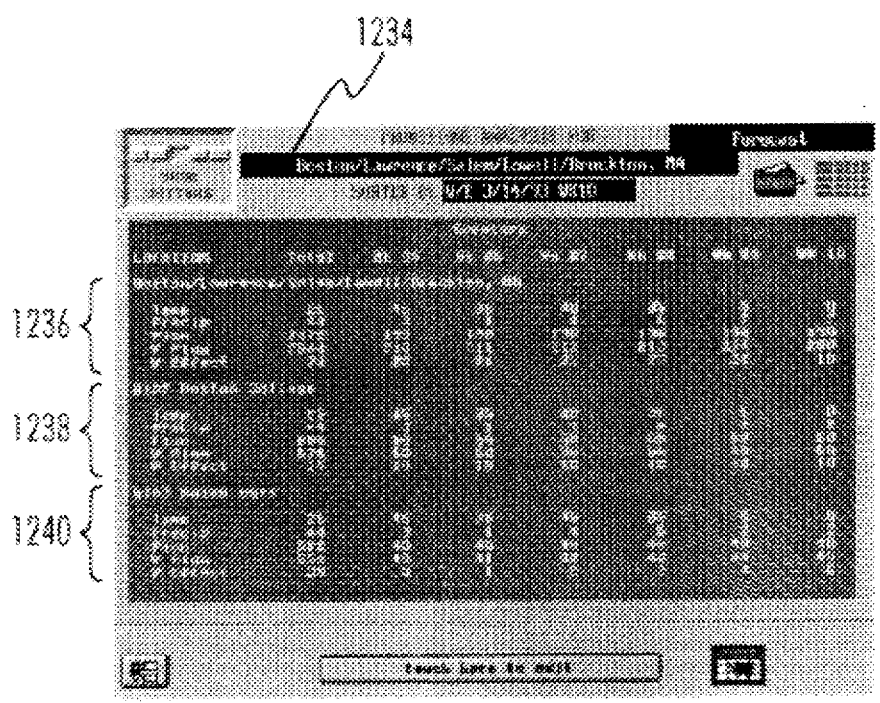
FIG. 12E is a display of the promotion analysis retail store units by MSA report screen.
Figure 12F:
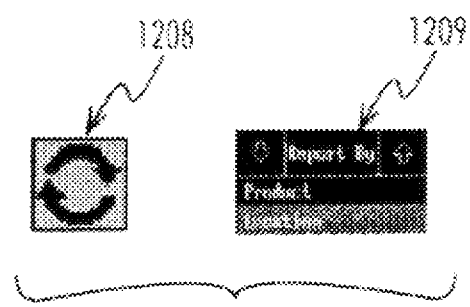
FIG. 12F is a display of the circular reference icon and the resulting report by selection window.
Figure 12G:
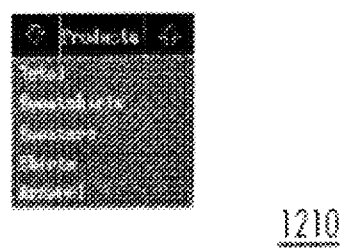
FIG. 12G is a display of the product selection window.
Figure 12H:
FIG. 12H is a display of the promotion analysis year-type selection window.

A user may obtain more detailed information for a selected location or product (depending on the selected mode) by selecting a specific product/location in the first column 1230. This will result in the display of the promotion analysis report screen 822, shown in FIG. 12E. Referring to FIG. 12E, the promotion analysis report screen 822 shows weather and selected product information for all the retail units/dollars in the location selected in the MSA as a whole, and below that, on each of the user's retail locations within that MSA.

An example is provided in FIGS. 12C-E. The user has selected MSA location Boston/Lawrence 1232 on promotional analysis screen 820 shown in FIG. 12C. The promotional analysis report screen 822 is displayed as shown in FIG. 12E. This is illustrated by location object 1234 at the top center of the promotional analysis report screen 822. Location object 1234 indicates that Boston/Lawrence MSA has been chosen. The report data for this selected MSA as a whole is provided in rows 1236. The report data for the retail store locations within the Boston/Lawrence MSA is provided in rows 1238 and 1240.

D. Product Analysis Function

The product analysis function 609 is invoked with the product analysis selection button 908. Referring to FIG. 8, this results in the display of the product analysis function screen 824. The product analysis function screen 824 is initially displayed with the product selection window 1210 overlaid. The product analysis function 609 provides the user with a quantitative presentation of the LY total actual sales; LY total deweatherized sales; TY total plan sales; and TY total weatherized planned sales, by product, at the MSA level. The product analysis screen 824 can be seen in two different formats. They are (1) product format which presents total sales data, by product, for all MSAs, and (2) MSA format which presents total sales data, by MSA, for all products.

Figure 13A:
FIG. 13A is a display of the product analysis selection button.
Figure 13B:
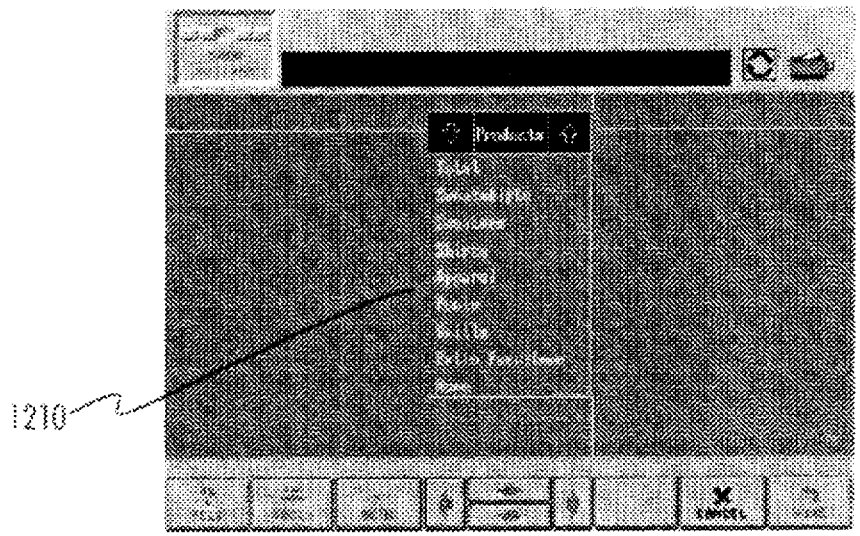
FIG. 13B is a display of product analysis screen with products selection window.
Figure 13C:
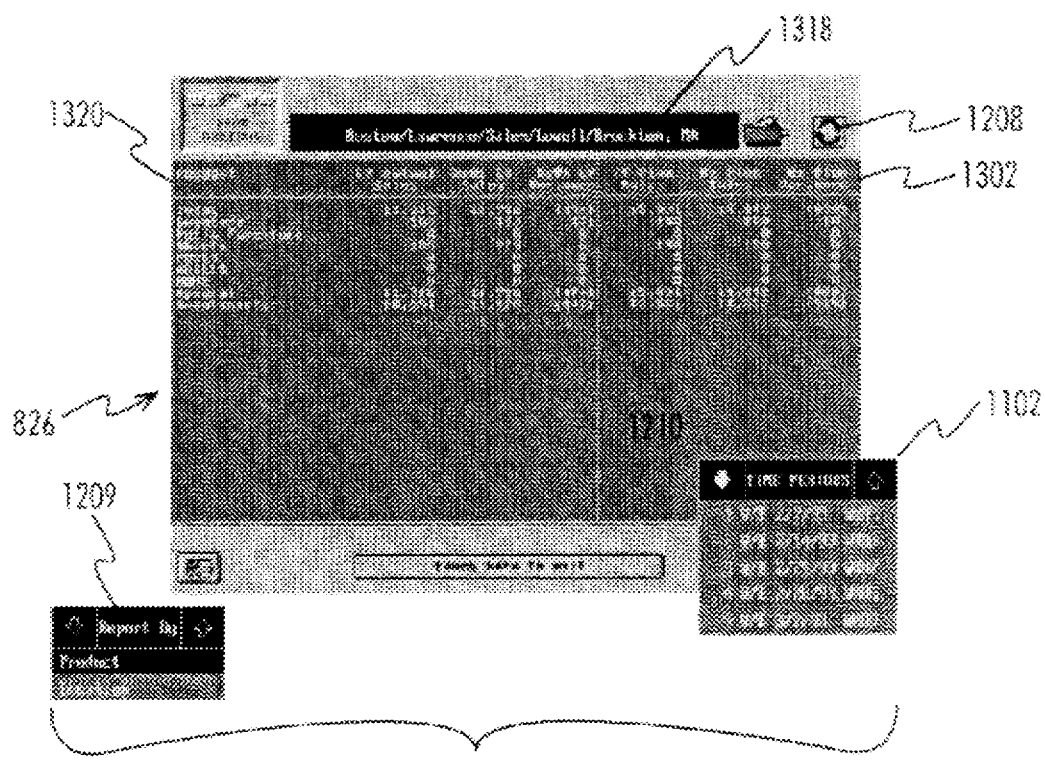
FIG. 13C is a display of the MSA_level report by selection window with the time periods selection window and report by selection window.

On product analysis function screen 824, the user must select a product from the product selection window 1210 to continue operating in this function. The user selects the product or total of products from the listing which results in the display of Product Information Screen 826. Referring to FIG. 13C, the product information screen 826 is illustrated. The product information screen 826 is a report format display. The column headings 1302 contain the actual, weatherized, and deweatherized weather/sales variables. The column 1304 contains the products. Thus, the product information screen 826 extrapolates the effect of weather impact on key products for a chosen location.

There are several selectable objects available to the user in the product information screen 826. The center-top object 1318 changes from a product or total products heading to a single MSA listing depending upon which way the report is sorted. There is also an object 1320 in the first row of the first column that changes from MSA to Product depending upon which way the report is sorted.

Center-top object 1318 lists all products and total products when in the Product mode and all MSA locations when in the MSA mode. This object allows the user to modify the displayed report by selecting only the item(s) and location(s) necessary. MSA/Product object 1320 lists all MSA locations when in MSA mode (default) and lists all products and total products when in Product mode. This object allows the user to modify the displayed report by selecting only the item(s) and location(s) required.

Circular Reference icon 1208 allows the user to change the report from the default, which is Product by Location, to Location by Product. As discussed above, selection of circular reference icon 1208 results in the Report By window 1209. This functions in the same manner as in the previous displays, allowing the user to choose to have the main focus of the report be an MSA location with a product, more than one product, or all products listed (the default), or the user can choose to have the main focus of your report be a product or a total of products with one or more MSA locations listed.

Figure 13D:
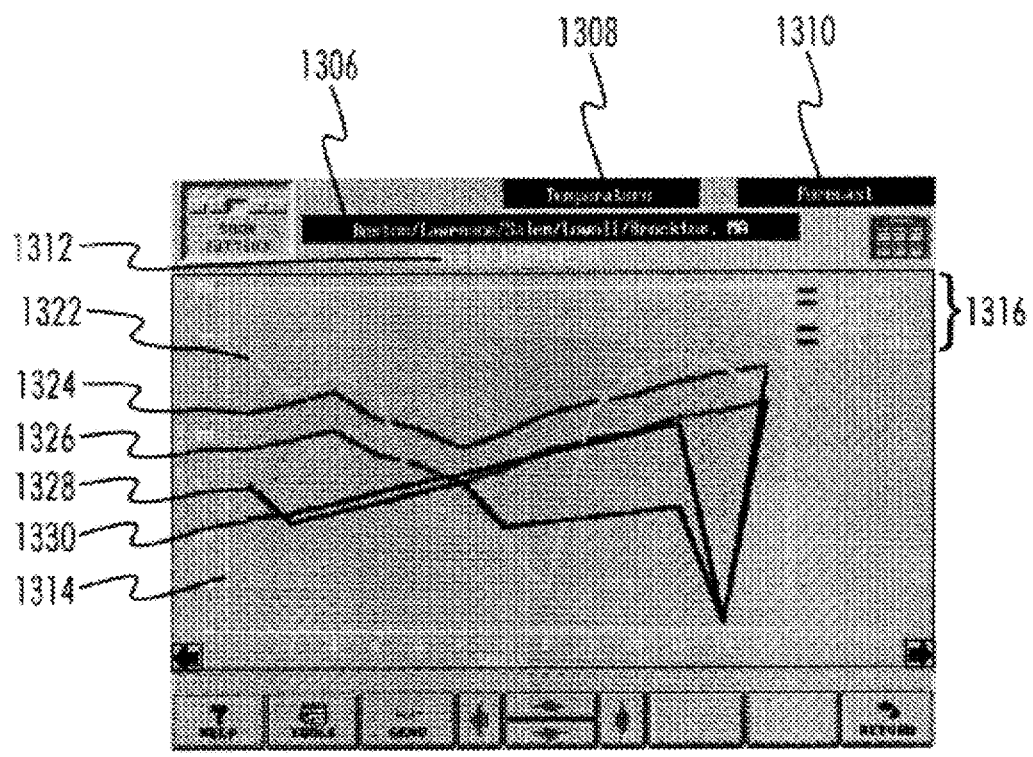
FIG. 13D is a display of the product analysis graph screen.

A user may obtain more detailed information for a selected location or product (depending on the selected mode) by selecting a specific product/location in the first column 1304. The user may choose any displayed product/ MSA from the listing in first column 1304. This will result in the display of the product analysis graph screen 828, shown in FIG. 13D. Referring to FIG. 13D, the product analysis graph screen 828 is a graphical presentation of the following weather/sales variables 1316:

1. TY total plan sales 1328
2. TY total weatherized planned sales 1330
3. Seasonal High 1324 of the selected weather category
4. Seasonal Low 1326 of the selected weather category
5. The Forecast of the selected weather category 1328

The TY total plan sales 1328 is the retailer's merchandising plan in sales units or dollars for the selected location 1306 and weather category 1308. The TY total weatherized planned sales 1330 are the retailer's planned sales unit or dollars with forecasted weather conditions taken into consideration. The Seasonal High 1324 of the selected weather category represents maximum values of the seasonal weather determination discussed above. The Seasonal Low 1326 of the selected weather category represents the minimum values of the seasonal weather determination discussed above. The Forecast of the selected weather category 1328 is the forecasted weather for the selected weather category.

There are three selectable objects across the center-top portion of the product analysis graph screen 828. The default settings for the top-most objects are Temperature and Forecast, and they will be identified as Weather-type and Year-type objects, respectively. The top-center object will contain either a product or an MSA listing depending upon the user's selection in the previous screen.

Weather-type object 1308 brings up the weather selection window 1130. This object allows the user to select either temperature, precipitation, or snow as the weather parameter. The year-type object 1310 brings up the year selection window. This object allows the user to graphically view forecast or LY (actual) weather. Object 1306 lists all product and total products when in product mode and all MSA locations when in MSA mode. This object allows the user to modify the graph to the user's exact needs by selecting only the item(s) and location(s) you need in the report at any one time.

E. Weather Forecasts Function

The weather forecasts function 609 is invoked with the weather forecasts selection button 910. Referring to FIG. 8, this results in the display of the weather forecasts map function screen 830. The weather forecasts map function screen 830 is a display of the contiguous United States 1402 divided into the nine regions discussed above. The weather forecasts function 609 provides the user with a quantitative comparison of this year's and last year's weather for a given location.

Figure 14A:
FIG. 14A is a display of the weather forecast selection button.
Figure 14B:
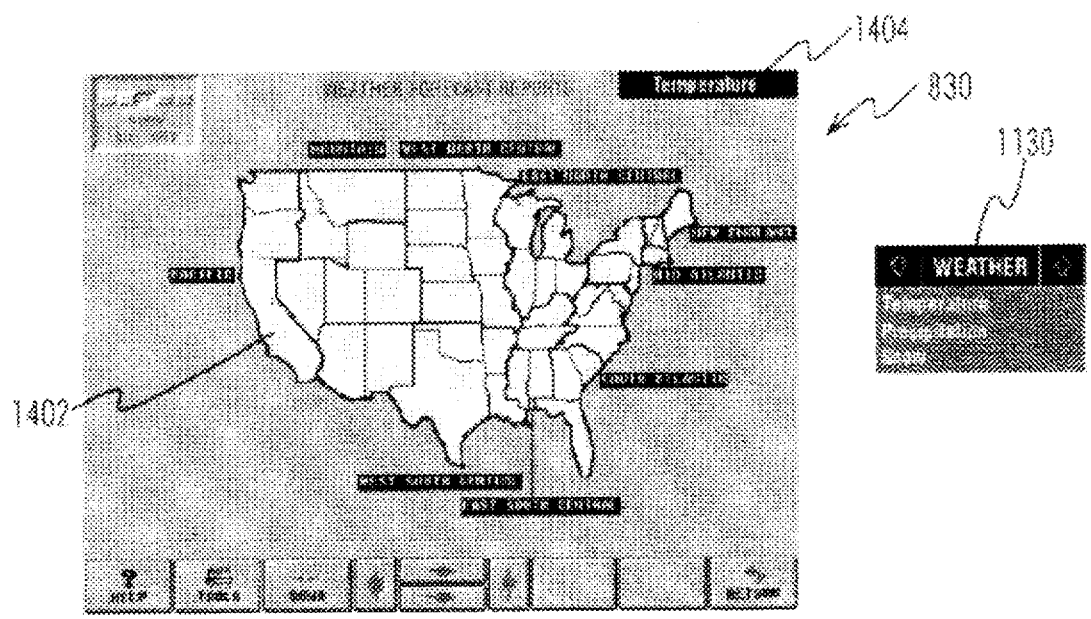
FIG. 14B is a display of the weather forecast map screen.
Figure 14C:
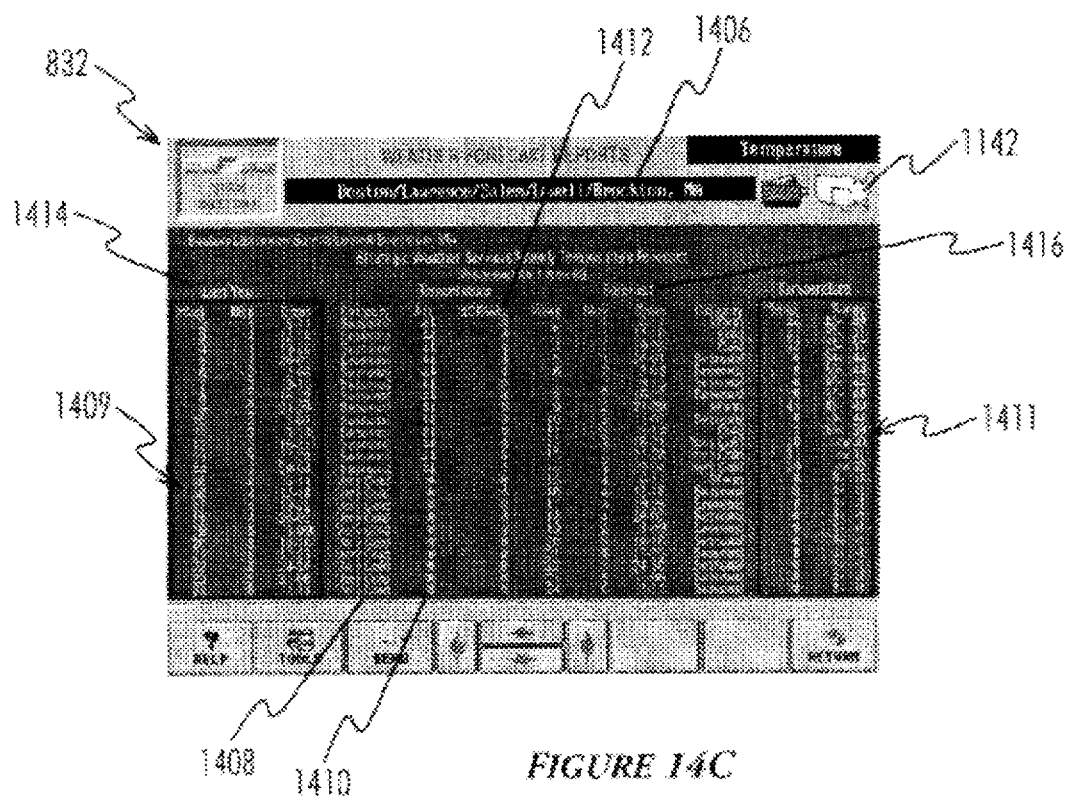
FIG. 14C is a display of the weather forecast report screen.

A user may select the desired weather parameter by selecting the top-right object 1404. This brings up the weather selection window 1130. The Weather selection window 1130 allows the user to select either temperature, precipitation or snow as the desired weather parameter display. After selecting the weather parameter, the user may then selects a specific location by region. The census region selectable objects (1104-1120) allow the user to select a specific region to display a full weather report for that region. This results in the display of the MSA list selection window 1136 from which the user selects a single MSA. This results in the display of the weather forecasts report screen 832 for the selected MSA. FIG. 14C illustrates a weather forecasts report screen 832 for the Boston/Lawrence MSA 1406.

Referring to FIG. 14C, the weather forecasts report screen 832 is a report format display, providing the user comparisons of the following dimensions of databases 504:

1. Last year's (LY) 1414 actual weather data (temperature, precipitation and snowfall) 1410 by time period (week) 1409, for a given location (MSA level) 1406.
2. This year's (TY) 1416 actual weather data (temperature, precipitation and snowfall) by time period (week), for a given location (MSA level), displayed in a analogous manner.
3. The normal of the weather data (temperature, precipitation and snowfall) 1412 by time period (week) 1409, for a given location (MSA level) 1406.

Time period 1409 is displayed in three columns for both last year's and this year's weather data. These are week by consecutive number in the year, month, and day of month. Time periods, however, may be daily, monthly, or some other period. The weather data is divided into various ranges, representing the relative values of the actual/ forecasted weather data with the derived seasonal range.

For forecasted weather, there is an additional column of range 1411 which displays the range of the forecasted weather parameter. In the weather forecast report screen 832 of FIG. 14C, the range 1411 is the temperature range for the illustrated weeks in the Boston/Lawrence MSA 1412.

There are several selectable objects available to the user in the weather forecast report screen 832. They are the MSA object 1412, the weather parameter object 1404, and the contiguous United States icon 1142. These function in the same manner as described above.

F. As-Of Function

The as-of function 611 is invoked with the As-Of selection button 912. The as-of function 611 is solely an information feature available to the user from the main menu banner screen 802. The selection of this function displays a text screen which contains the date on which the weather information was updated.

VIII. Technical Interfaces Between Applications Development Tool and Database Management System This section defines the interface between the APG 302 and databases 504. The methodology for this communication will be described with reference to a specific example in the location analysis function 606 of LEWIS™ 202. This example will illustrate the navigational path of a user from the location analysis function screen 812 shown in FIG. 11C to a selected map-by-region screen 814.

This one of many interface scenarios which may occur in LEWIS™ 202. The user is referred to the Appendices for the architecture of each LEWIS™ screen, including its associated objects defined above. The Appendices also include all scripts (defined below) which are created and executed to achieve the desired interface functions. Additional information may be found in the Commander™ manuals incorporated by reference above as well the One-Up™ Multi-dimensional Modelling Reference Manual, also available from Comshare, Inc., herein incorporated by reference in its entirety.

Figure 15:
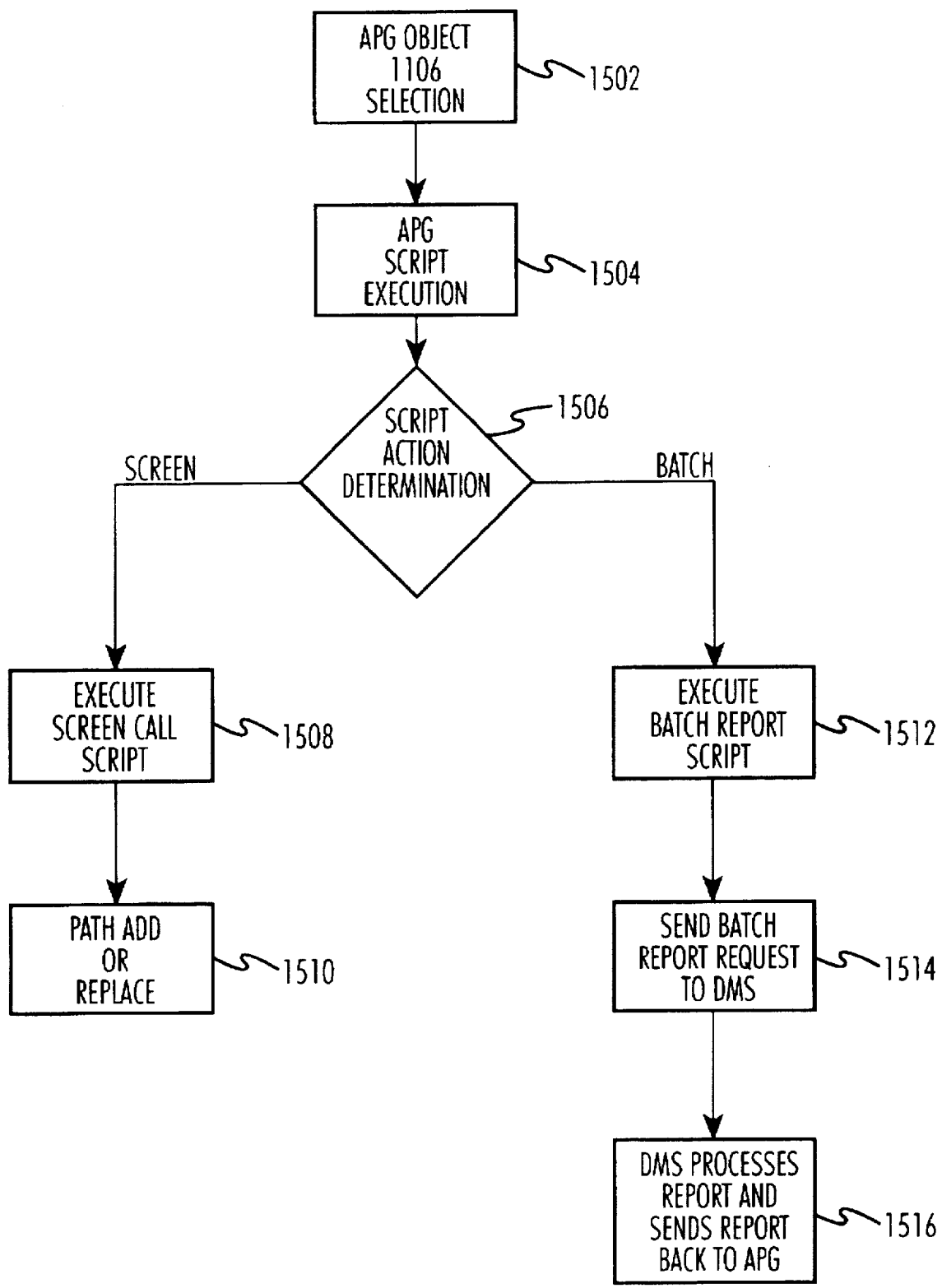
FIG. 15 is a flowchart of the APG-DMS technical interface.

FIG. 15 illustrates the functional steps performed by the APG 302 and DMS 508. Referring to FIGS. 15, when a user selects an object on display 700, step 1502, the APG 302 executes a script associated with the selected object. A script consists of one or more actions performed in a sequence, such as manipulating documents and files, manipulating variables, calling other screens, modifying screen objects, etc. In the example, the user selects New England Regional object 1106 on contiguous US map screen 812, shown in FIG. 11C. The object, which may be found on page A2-4 of the appendices is:

Object: NE
Location 27875,17628
Size: 4763,936
Shape: Rectangle
Text: NEW ENGLAND
Script:
ASSIGN <LOC.MAP>="<OBJECTNAME>"
ASSIGN                   <DOCUMENT>=
"<APPLID><LOC.MAP>V10SCREEN WEATHER"
PATH REPLACE SCREEN <DOCUMENT>

The name of the object is NE, as shown on the object line. The location, size, and shape determine the illustrated position and size of the rectangle 1106 in FIG. 11C. The text displayed inside the rectangle is "NEW ENGLAND." The script associated with the NE object 1106 is as shown.

In step 1504, APG 302 executes the script, resulting in any of the above functions depending upon which object was selected. In this step, script assigns variables to determine the current screen configuration. In this example, two variables are assigned as shown above.

In step 1506, APG 302 determines the appropriate action based on the type of script, if the script is a screen call script, APG 302 executes a screen call script in step 1508. In this example, the script executes the command "PATH REPLACE SCREEN <DOCUMENT>." APG 302 then calls and replaces the existing function screen with the requested or called screen in step 1510. This is referred to as a path replace. In this example, object NE 1106 has an associated script which calls map-by-region screen 814. The script replaces the contiguous US map screen 812 with the map-by-region screen 814.

If the script is a batch report request script, then APG 302 generates a report request in step 1512. This process involves the building of a batch file to automate a sequence of actions to perform on the DMS databases 504. In this example, from the map-by-region function screen 814 (FIG. 11D), the user selects the Boston MSA 1139. This results in the display of the MSA level product report screen 816 shown in FIG. 11E.

The Boston MSA object 1139 is names MSA7 and is found on page A5-4 of the appendices. Numerous nested scripts are executed when this object is invoked. They are:

LO-REP-MSA SCRIPT
LO-SHOW-REP SCRIPT
LO-REPORT SCRIPT
OUBATCH SCRIPT

The scripts perform the following actions to ultimately display the MSA level product report screen 816. The "LO-REP-MSA" script assigned variables and executes subsequent nested scripts. The "LO-SHOW-REP" script renders the existing objects on the map-by-region function screen 814 invisible and then renders the necessary report objects for the MSA-level product report screen 816. Afterwards, the script executes additional nested scripts. The "LO-REPORT" script assigned variables and constructs the batch report request file. The "OUBATCH" script is described below with reference to step 1514.

After building the batch file, APG 302 sends the batch file to the DMS for processing in step 1512. In the preferred embodiment, this batch file is referred to as "Oubatch™," a trademark of Comshare, Inc. However, the batch file may take on any configuration appropriate for the interface between the applications development tool and the database management system. In this example, the "OUBATCH" script executes the batch report request file and submits it to the DMS for processing.

In step 1516, database management system 508 performs the following functions when it receives the above batch file. The DMS interrogates the batch file and determines the following: which of the databases 504 to use, what dimension members to use, and what report format to use. The DMS then executes the report and transfers it back to the APG 302 to display the MSA-level product report screen 816.

Although the invention has been described and illustrated with a certain degree of particularity, it is understood that those skilled in the art will recognize a variety of additional applications and appropriate modifications within the spirit of the invention and the scope of the claims.

What is claimed is:

1. A graphical user interface in a computer based system, comprising:

a plurality of computer based databases having stored therein weather data and sales data, said sales data including prior actual sales data, prior deweatherized sales data, predicted sales data, and predicted weatherized sales data;

command receiving means for receiving a command from an operator;

determining means for determining whether said command designates a location analysis function; and location analysis performing means, responsive to said determining means, for performing location analysis if said command designates a location analysis function;

wherein said location analysis performing means comprises:

means for prompting the operator for a time period;

means for receiving from the operator information identifying a time period;

geographical area image displaying means for displaying an image of a geographical area having a plurality of metropolitan statistical areas (MSAs);

weather data retrieving means for retrieving from said databases weather data for said time period and said geographical area;

weather data displaying means for displaying over said image of said geographical area graphical objects that represent said weather data;

MSA selecting means for enabling the operator to select one of said MSAs;

means, responsive to said MSA selecting means, for receiving from the operator information that identifies a MSA selected by the operator; and MSA-level product report displaying means for displaying a MSA-level product report containing information corresponding to said MSA selected by the operator, said MSA-level product report displaying means comprising:

means for retrieving from said databases prior actual sales data, prior deweatherized sales data, predicted sales data, and predicted weatherized sales data for said MSA selected by the operator; and means for displaying said prior actual sales data, prior deweatherized sales data, predicted sales data, and predicted weatherized sales data in said MSA-level product report.

2. The system of claim 1, wherein said geographical area image displaying means displays an image of a geographical area having a plurality of metropolitan statistical areas (MSAs), and wherein said weather data retrieving means retrieves from said databases weather data for each of said MSAs for said time period.

3. The system of claim 2, wherein said weather data displaying means comprises:

means for selecting one of said MSAs;

means for generating a graphical object that graphically represents weather data corresponding to said selected MSA; and means for displaying said graphical object over an area of said image of said geographical area generally corresponding to a position of said selected MSA in said geographical area.

4. The system of claim 1, wherein said geographical area image displaying means displays an image of a geographical area representing a nation, the nation including a plurality of census regions, each census region including one or more metropolitan statistical areas (MSAs), and wherein said weather data retrieving means retrieves from said databases weather data for MSAs displayed in said image of said geographical area.

5. The system of claim 4, wherein said location analysis performing means further comprises:

census region selecting means for enabling the operator to select one of said census regions;

means, responsive to said census region selecting means, for receiving from the operator information identifying a census region selected by the operator;

means for displaying an enlarged image of a geographical area representing said selected census region;

means for retrieving from said databases weather data for MSAs displayed in said enlarged image of said geographical area representing said selected census region; and means for displaying over said enlarged image said weather data for MSAs displayed in said enlarged image of said geographical area representing said selected census region.

6. The system of claim 5, wherein said location analysis performing means further comprises:

MSA selecting means for enabling the operator to select one of a plurality of MSAs displayed in said enlarged image of said geographical area representing said selected census region;

means, responsive to said MSA selecting means, for receiving from the operator information that identifies a MSA selected by the operator; and MSA-level product report displaying means for displaying a MSA-level product report containing information corresponding to said selected MSA, said MSA-level product report displaying means comprising:

means for retrieving from said databases detailed sales and weather information for said selected MSA; and means for displaying said detailed sales and weather information in said MSA-level product report.

7. A graphical user interface in a computer system, comprising:

a plurality of databases having stored therein weather data, product data, client data, and correlation data;

command receiving means for receiving a command from an operator;

determining means for determining whether said command designates a promotion analysis function; and promotion analysis performing means, responsive to said determining means, for performing promotion analysis if said command designates a promotion analysis function;

wherein said promotion analysis performing means comprises:

first prompting means for prompting the operator for a product;

means, responsive to said first prompting means, for receiving from the operator information identifying a product;

second prompting means for prompting the operator for a time period;

means, responsive to said second prompting means, for receiving from the operator information identifying a time period;

data retrieving means for retrieving from said databases sales data and weather data corresponding to said product and said time period; and data displaying means for displaying said retrieved sales data and weather data in such a manner to indicate positive and negative effects of weather on sales of said product over said time period;

wherein said database store data for a plurality of metropolitan statistical areas (MSAs), said promotion analysis performing means further comprising:

means for enabling the operator to identify any number of said MSAs;

wherein said data retrieving means retrieves from said databases sales data and weather data corresponding to said product and said time period for said identified MSAs;

and wherein said data displaying means displays said retrieved sales data and weather data in such a manner to indicate positive and negative effects of weather on sales of said product in each of said identified MSAs over time period.

8. The system of claim 7, wherein said data displaying means comprises:

means for displaying a scrollable table having an entry for each of said MSAs;

means for displaying, for each MSA, a first graphical object in a table entry associated with said each MSA if sales of said product in said each MSA over said time period was positively affected by weather; and means for displaying, for said each MSA, a second graphical object in said table entry associated with said each MSA if sales of said product in said each MSA over said time period was negatively affected by weather.

9. The system of claim 8, wherein said first graphical object is an UP arrow, and said second graphical object is a DOWN arrow.

10. The system of claim 7, wherein said promotion analysis performing means further comprises:

means for enabling the operator to select for display "forecast weather/sales data" or "actual weather/sales data";

said data retrieving means comprising:

means for retrieving from said databases this year's forecasted sales data and weather data corresponding to said product and said time period if the operator selected "forecast weather/sales data"; and means for retrieving from said databases a prior year's actual sales data and weather data corresponding to said product and said time period if the operator selected "actual weather/sales data".

11. The system of claim 7, wherein said promotion analysis performing means further comprises:

means for enabling the operator to identify a location;

wherein said data retrieving means comprises means for retrieving from said databases sales data and weather data corresponding to all products sold in said identified location during said time period;

and wherein said data displaying means comprises means for displaying said retrieved sales data and weather data in such a manner to indicate positive and negative effects of weather on sales of said products sold in said identified location during said time period.

12. A graphical user interface in a computer system, comprising:

a plurality of multi-dimensional databases having stored therein weather data, product data, client data, and correlation data;

command receiving means for receiving a command from an operator;

determining means for determining whether said command designates a view function; and view function performing means, responsive to said determining means, for performing a view function if said command designates a view function;

wherein said view function performing means comprises:

means for generating and displaying a view screen having a down section, an across section, a By1 section, and a By2 section;

first dimension associating means for enabling the operator to associate a first dimension of said databases with said down section, and for enabling the operator to enter a value for said first dimension;

second dimension associating means for enabling the operator to associate a second dimension of said databases with said across section, and for enabling the operator to enter a value for said second dimension;

third dimension associating means for enabling the operator to associate a third dimension of said databases with said By1 section, and for enabling the operator to enter a value for said third dimension;

fourth dimension associating means for enabling the operator to associate a fourth dimension of said databases with said By2 section, and for enabling the operator to enter a value for said fourth dimension;

data retrieval means for retrieving from said databases sales and weather data corresponding to said values for said first, second, third, and fourth dimensions; and data displaying means for displaying said retrieved sales and weather data in said down and across sections;

wherein said databases store data for a plurality metropolitan statistical areas (MSAs), said view function performing means further comprising:

means for enabling the operator to identify any number of said MSAs;

wherein said data retrieval means retrieves from said databases sales data and weather data for said identified MSAs;

and wherein said data displaying means displays said retrived sales data and weather data for said identified MSAs.

13. The system of claim 12, wherein said first dimension is equal to weather/sales variables, said second dimension is equal to time period, said third dimension is equal to location, and said fourth dimension is equal to product, wherein said data retrieval means retrieves from said databases sales and weather data for a time period, location, and product entered by the operator.

* * * * *